US012627967B2

(12) United States Patent　　　　(10) Patent No.:　US 12,627,967 B2
Ekbatani et al.　　　　　　　　　　(45) Date of Patent:　　　May 12, 2026

(54) TECHNIQUES TO CONFIGURE LOW NOISE AMPLIFIER FOR DUAL-SUBSCRIBER DUAL-ACTIVE USER EQUIPMENT

(71) Applicant: QUALCOMM Incorporated, San Diego, CA (US)

(72) Inventors: Siavash Ekbatani, San Diego, CA (US); Qingxin Chen, San Diego, CA (US); Yuanning Yu, Santa Clara, CA (US); Paolo Minero, La Jolla, CA (US); Sandeep Rao, San Diego, CA (US); Bo Wen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 18/063,243

(22) Filed: Dec. 8, 2022

(65) Prior Publication Data

US 2024/0196190 A1　　Jun. 13, 2024

(51) Int. Cl.
　　*H04W 88/06*　　　　(2009.01)
　　*H04W 8/18*　　　　(2009.01)
(52) U.S. Cl.
　　CPC ............. *H04W 8/18* (2013.01); *H04W 88/06* (2013.01)
(58) Field of Classification Search
　　CPC ................................ H04W 8/18; H04W 88/06
　　USPC ........................................................ 455/418
　　See application file for complete search history.

(56) References Cited

U.S. PATENT DOCUMENTS

| | | | |
|---|---|---|---|
| 10,420,161 B1 | 9/2019 | Sava et al. | |
| 12,200,562 B2 * | 1/2025 | Kumar | H04W 36/0085 |
| 2022/0053607 A1 * | 2/2022 | Rice | H04W 72/569 |
| 2022/0312347 A1 * | 9/2022 | Cherian | H04B 17/318 |

FOREIGN PATENT DOCUMENTS

| | | |
|---|---|---|
| WO | WO-2021119469 A1 | 6/2021 |
| WO | WO-2022203802 A1 | 9/2022 |

OTHER PUBLICATIONS

International Search Report and Written Opinion—PCT/US2023/037194—ISA/EPO—Mar. 1, 2024.

* cited by examiner

*Primary Examiner* — Jirapon Tulop
(74) *Attorney, Agent, or Firm* — Holland & Hart LLP/Qualcomm Incorporated

(57)　　　　ABSTRACT
Methods, systems, and devices for wireless communications are described for low noise amplifier (LNA) configurations of a user equipment (UE) operating in a dual-subscriber dual-active (DSDA) mode. The UE may establish first and second communications links via two or more antenna ports using a first subscriber identity module (SIM) and a second SIM in the DSDA mode. The UE may identify a LNA configuration from two or more available LNA configurations for receiving at least partially concurrent communications of the first SIM and the second SIM based at least in part on activation of the DSDA mode and a difference between a first received signal strength associated with the first SIM and a second received signal strength associated with the second SIM. The UE may receive the at least partially concurrent communications via the two or more antenna ports based at least in part on the identified LNA configuration.

30 Claims, 17 Drawing Sheets

Reference Signal(s) 250

DL Transmission(s) 255

UL Transmission(s) 260

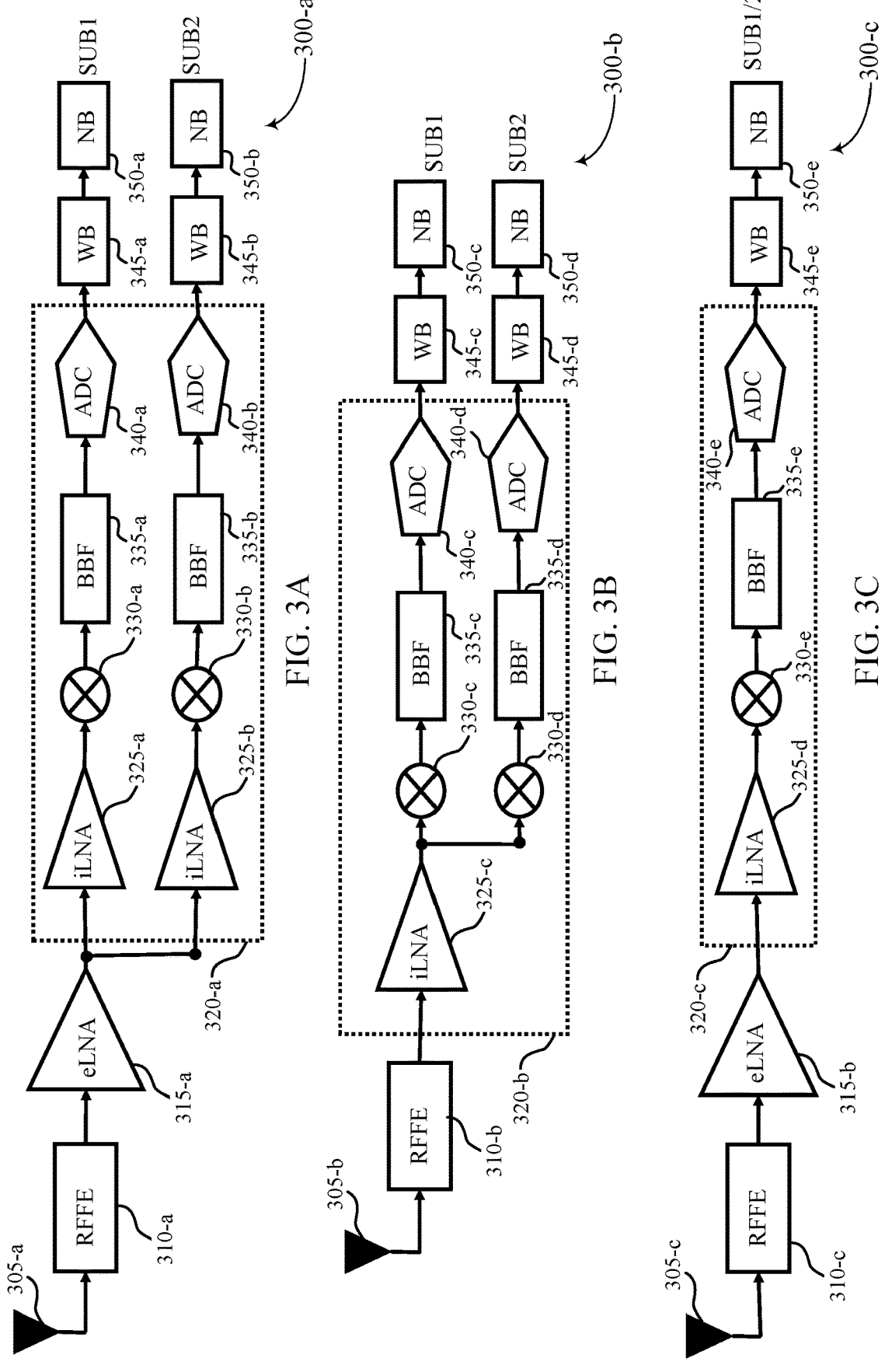

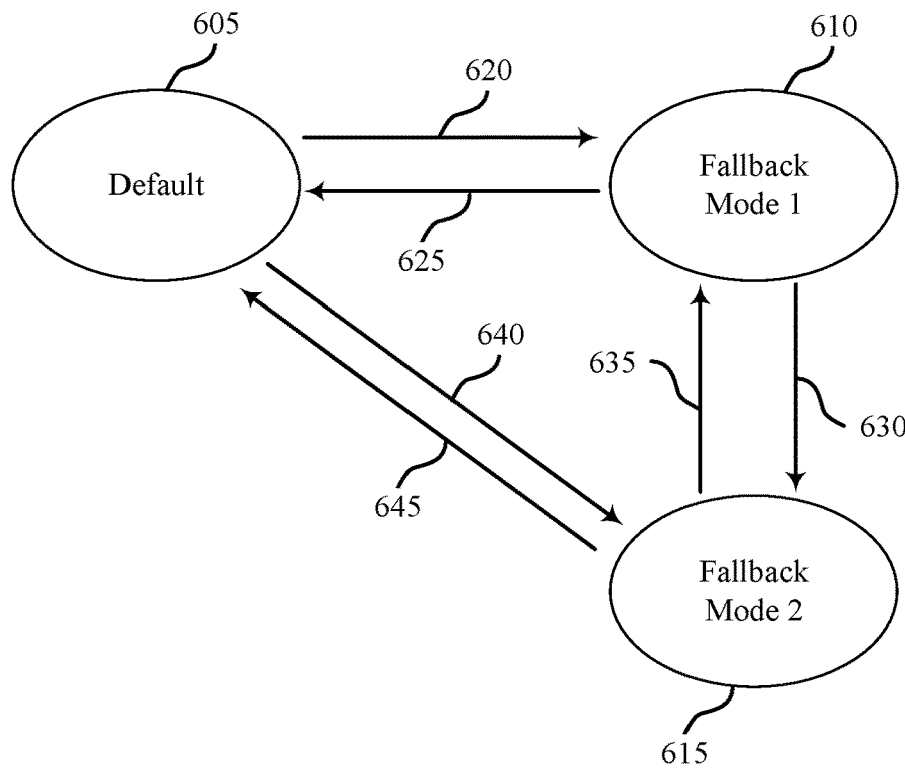
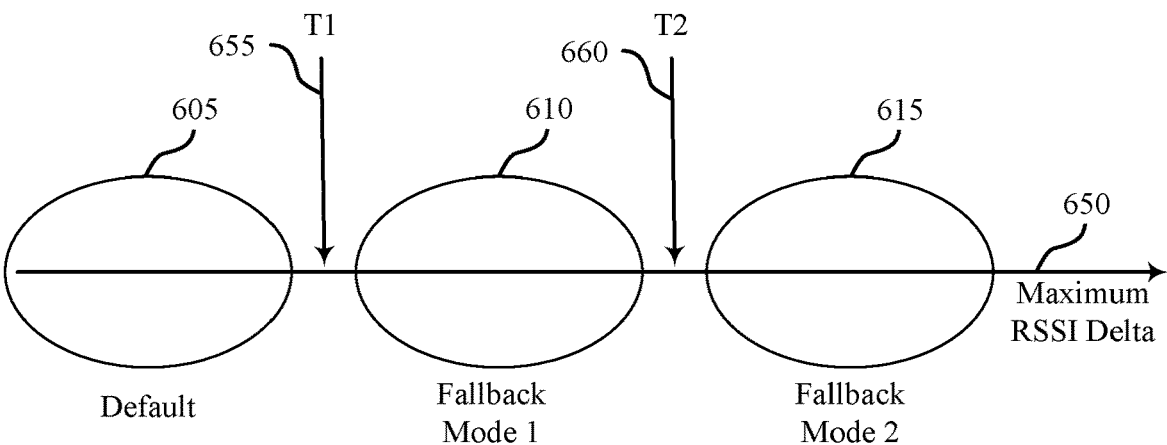
FIG. 6

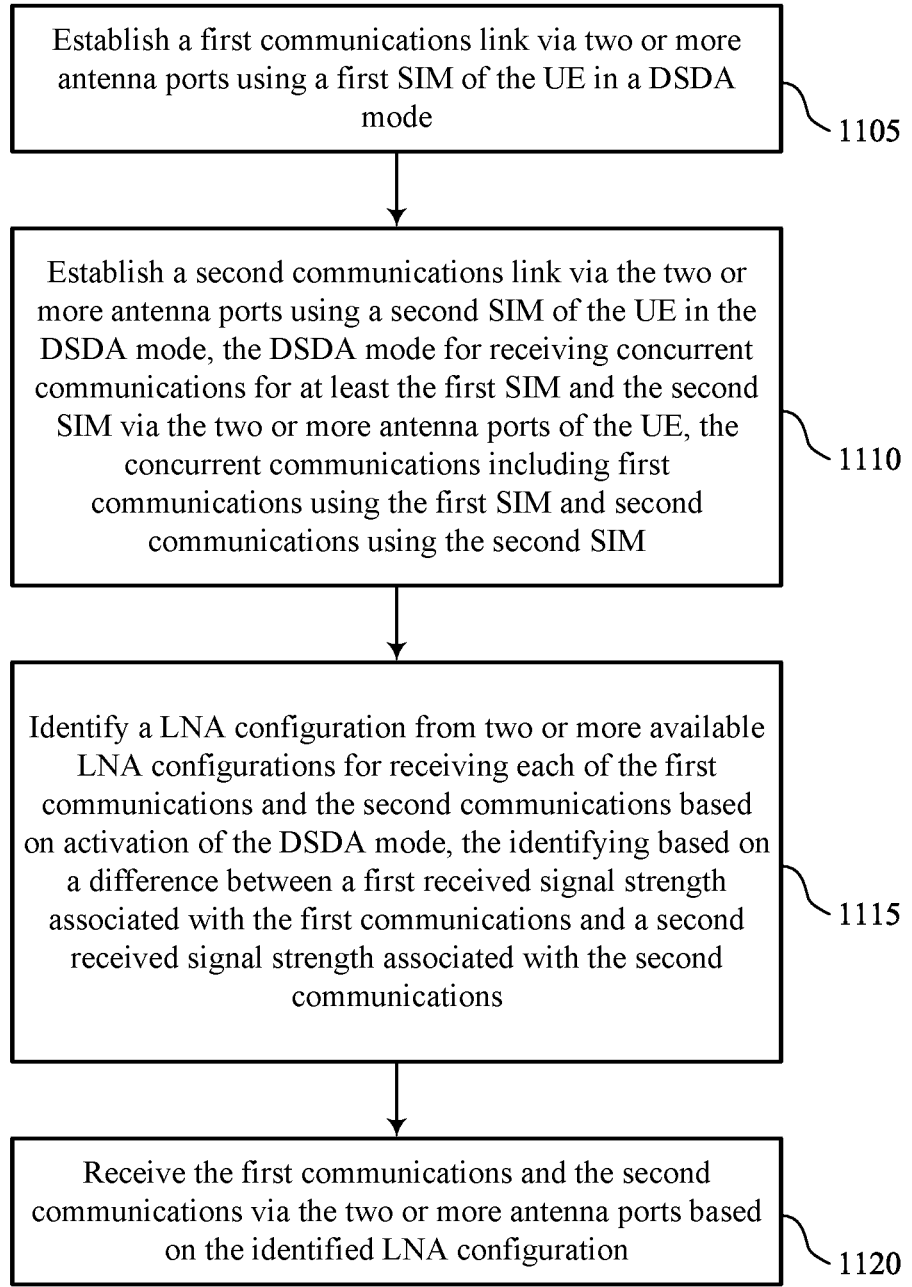

Establish a first communications link via two or more antenna ports using a first SIM of the UE in a DSDA mode                    1105

Establish a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM                    1110

Identify a LNA configuration from two or more available LNA configurations for receiving each of the first communications and the second communications based on activation of the DSDA mode, the identifying based on a difference between a first received signal strength associated with the first communications and a second received signal strength associated with the second communications                    1115

Receive the first communications and the second communications via the two or more antenna ports based on the identified LNA configuration                    1120

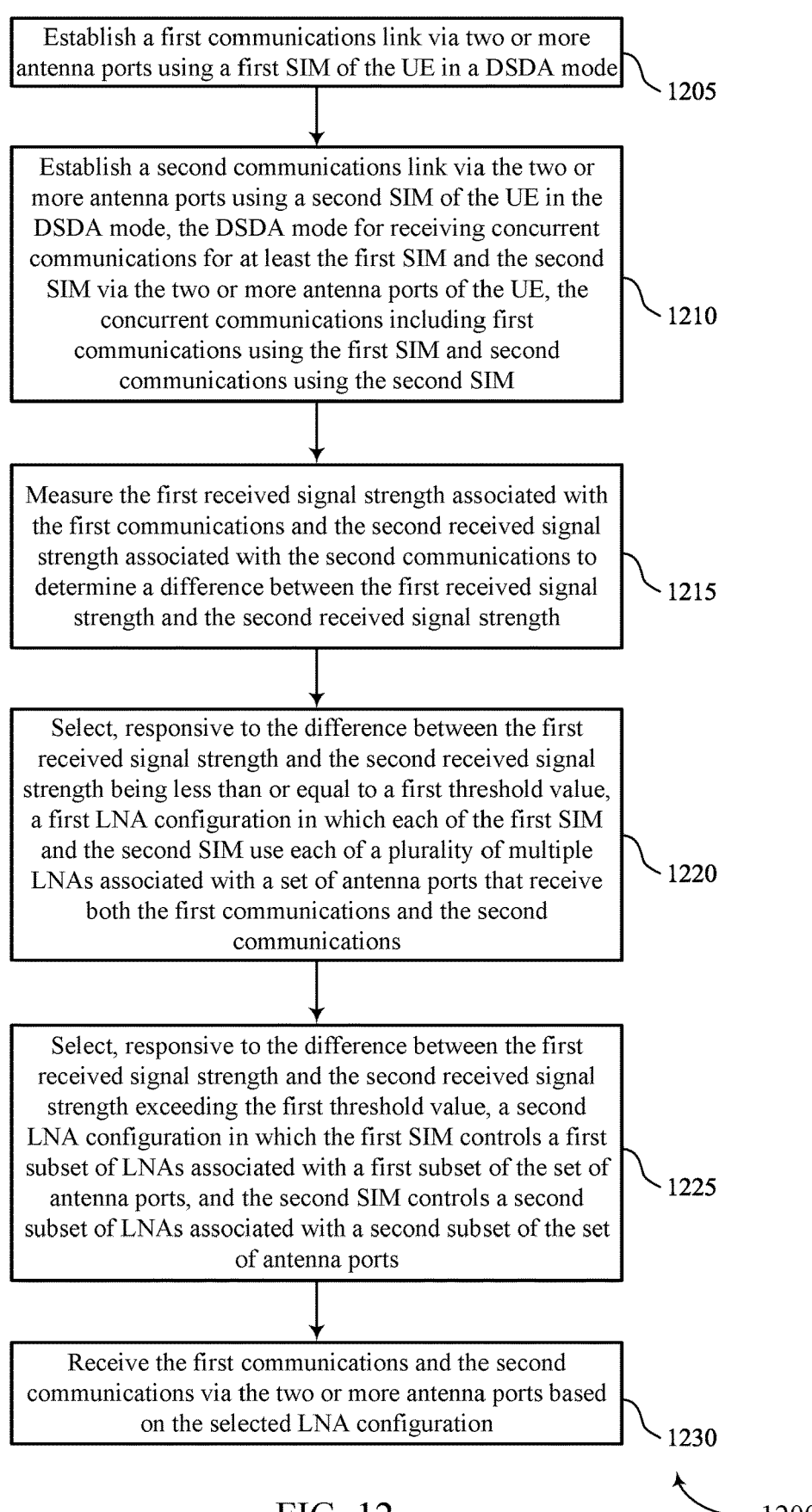

Establish a first communications link via two or more antenna ports using a first SIM of the UE in a DSDA mode — 1205

Establish a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM — 1210

Measure the first received signal strength associated with the first communications and the second received signal strength associated with the second communications to determine a difference between the first received signal strength and the second received signal strength — 1215

Select, responsive to the difference between the first received signal strength and the second received signal strength being less than or equal to a first threshold value, a first LNA configuration in which each of the first SIM and the second SIM use each of a plurality of multiple LNAs associated with a set of antenna ports that receive both the first communications and the second communications — 1220

Select, responsive to the difference between the first received signal strength and the second received signal strength exceeding the first threshold value, a second LNA configuration in which the first SIM controls a first subset of LNAs associated with a first subset of the set of antenna ports, and the second SIM controls a second subset of LNAs associated with a second subset of the set of antenna ports — 1225

Receive the first communications and the second communications via the two or more antenna ports based on the selected LNA configuration — 1230

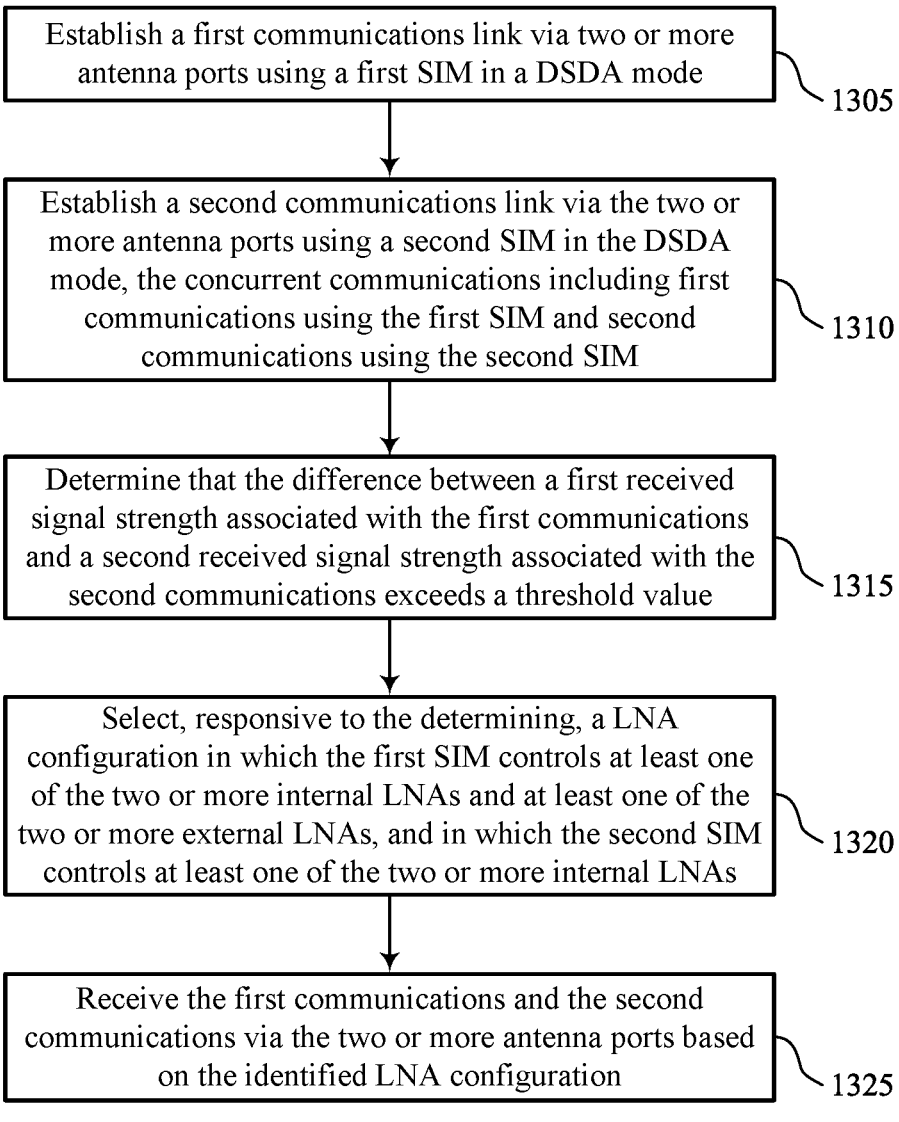

Establish a first communications link via two or more antenna ports using a first SIM in a DSDA mode ⟶ 1305

Establish a second communications link via the two or more antenna ports using a second SIM in the DSDA mode, the concurrent communications including first communications using the first SIM and second communications using the second SIM ⟶ 1310

Determine that the difference between a first received signal strength associated with the first communications and a second received signal strength associated with the second communications exceeds a threshold value ⟶ 1315

Select, responsive to the determining, a LNA configuration in which the first SIM controls at least one of the two or more internal LNAs and at least one of the two or more external LNAs, and in which the second SIM controls at least one of the two or more internal LNAs ⟶ 1320

Receive the first communications and the second communications via the two or more antenna ports based on the identified LNA configuration ⟶ 1325

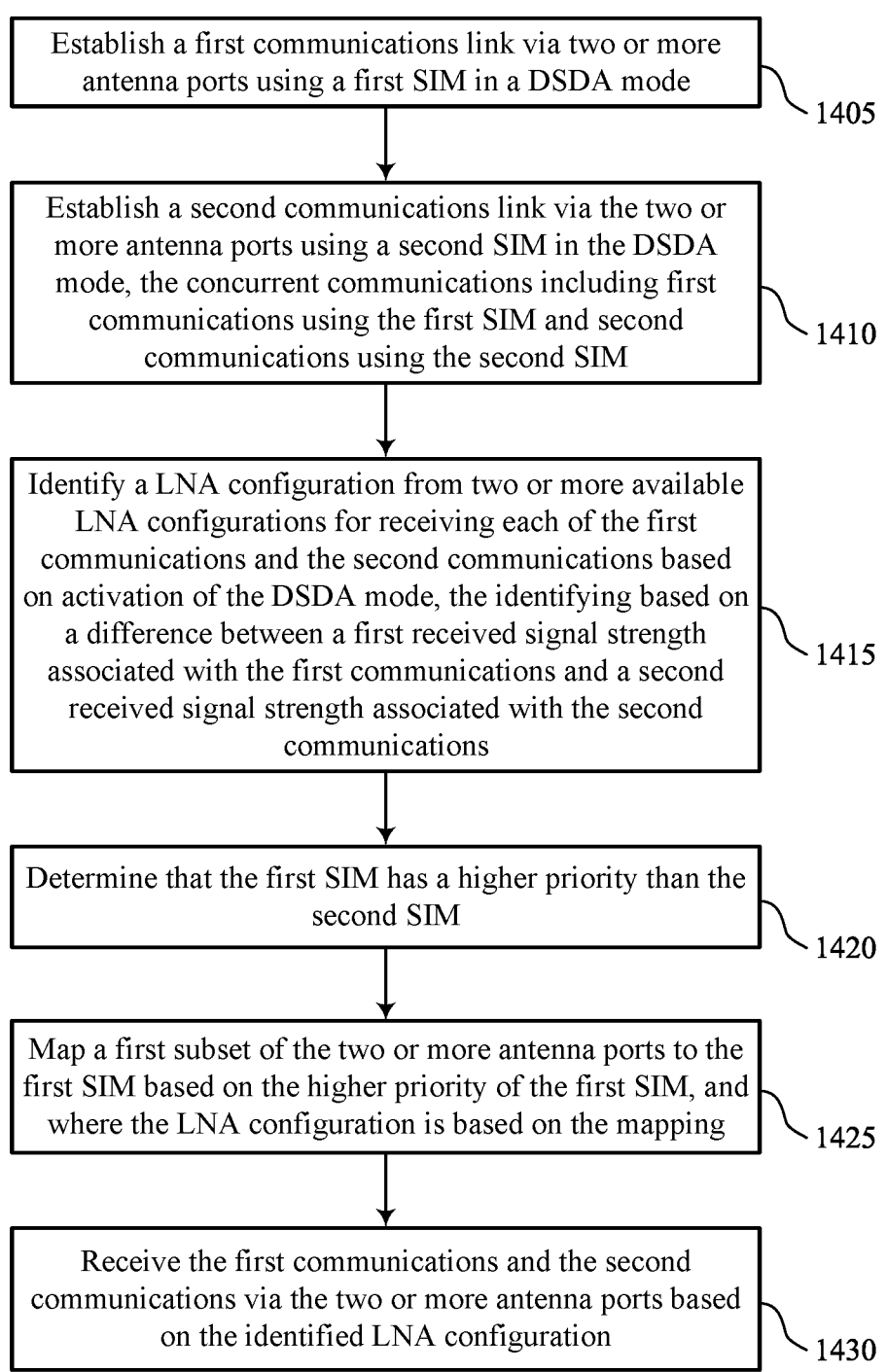

Establish a first communications link via two or more antenna ports using a first SIM in a DSDA mode — 1405

Establish a second communications link via the two or more antenna ports using a second SIM in the DSDA mode, the concurrent communications including first communications using the first SIM and second communications using the second SIM — 1410

Identify a LNA configuration from two or more available LNA configurations for receiving each of the first communications and the second communications based on activation of the DSDA mode, the identifying based on a difference between a first received signal strength associated with the first communications and a second received signal strength associated with the second communications — 1415

Determine that the first SIM has a higher priority than the second SIM — 1420

Map a first subset of the two or more antenna ports to the first SIM based on the higher priority of the first SIM, and where the LNA configuration is based on the mapping — 1425

Receive the first communications and the second communications via the two or more antenna ports based on the identified LNA configuration — 1430

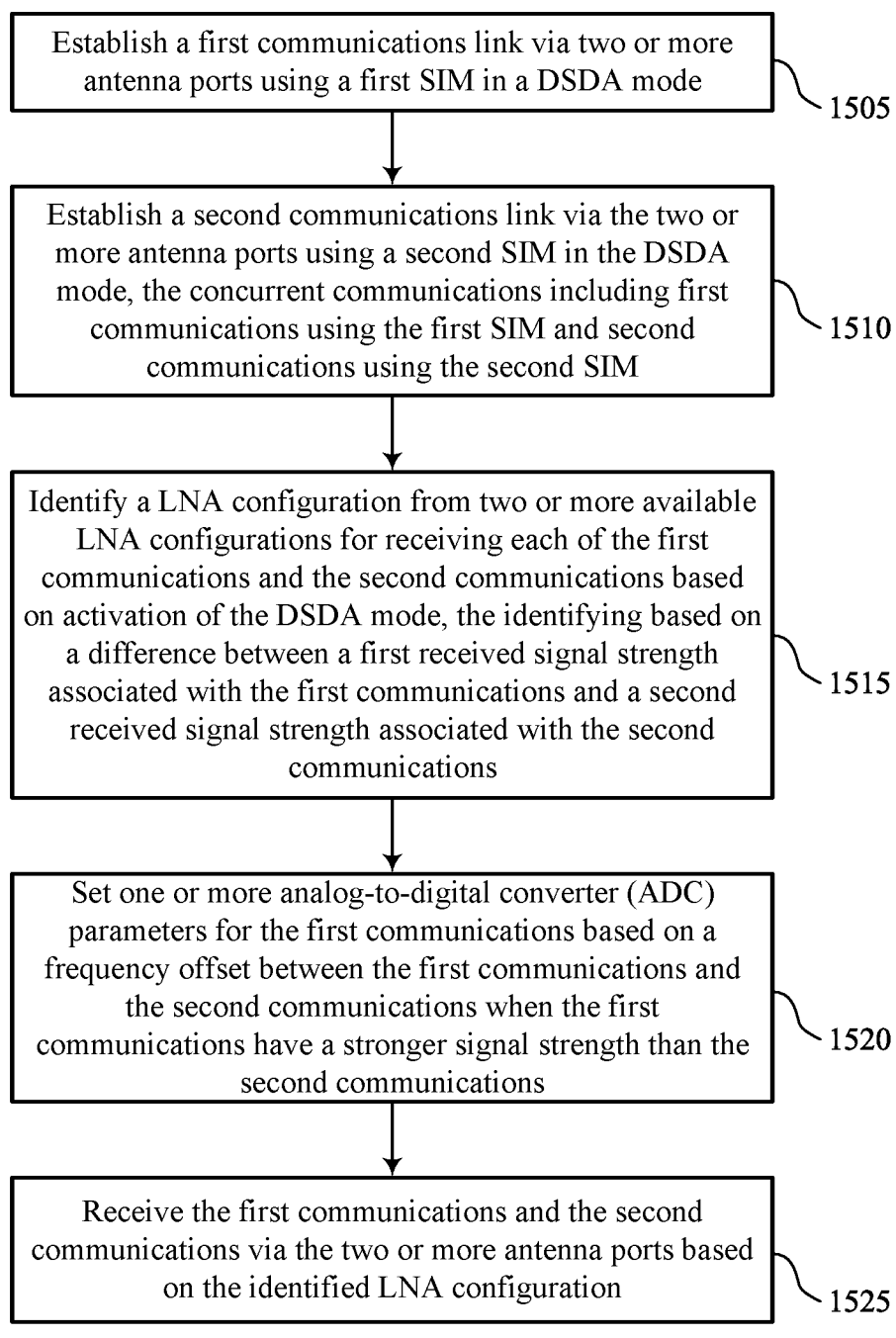

Establish a first communications link via two or more antenna ports using a first SIM in a DSDA mode

1505

Establish a second communications link via the two or more antenna ports using a second SIM in the DSDA mode, the concurrent communications including first communications using the first SIM and second communications using the second SIM

1510

Identify a LNA configuration from two or more available LNA configurations for receiving each of the first communications and the second communications based on activation of the DSDA mode, the identifying based on a difference between a first received signal strength associated with the first communications and a second received signal strength associated with the second communications

1515

Set one or more analog-to-digital converter (ADC) parameters for the first communications based on a frequency offset between the first communications and the second communications when the first communications have a stronger signal strength than the second communications

1520

Receive the first communications and the second communications via the two or more antenna ports based on the identified LNA configuration

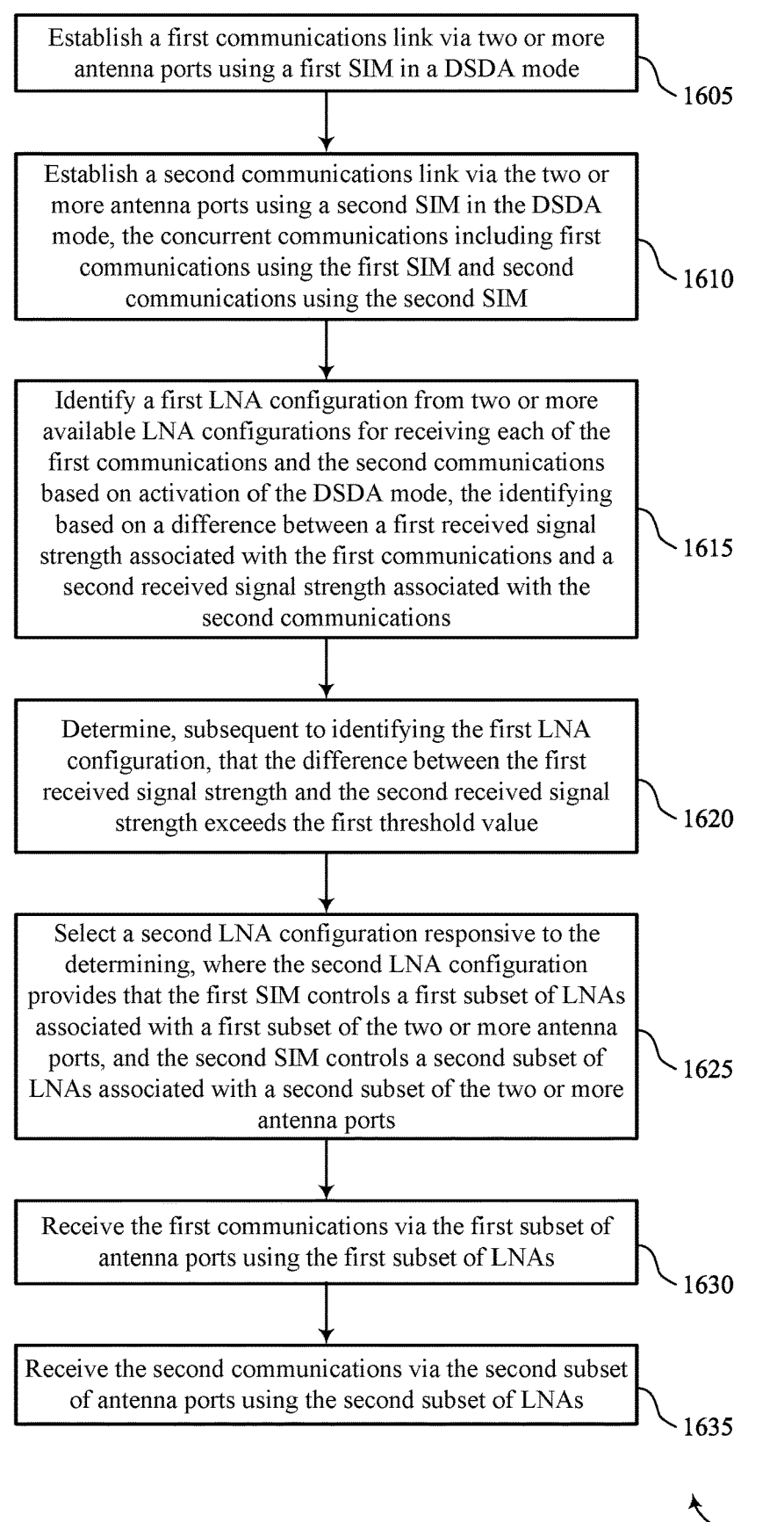

Establish a first communications link via two or more antenna ports using a first SIM in a DSDA mode ⟍ 1605

Establish a second communications link via the two or more antenna ports using a second SIM in the DSDA mode, the concurrent communications including first communications using the first SIM and second communications using the second SIM ⟍ 1610

Identify a first LNA configuration from two or more available LNA configurations for receiving each of the first communications and the second communications based on activation of the DSDA mode, the identifying based on a difference between a first received signal strength associated with the first communications and a second received signal strength associated with the second communications ⟍ 1615

Determine, subsequent to identifying the first LNA configuration, that the difference between the first received signal strength and the second received signal strength exceeds the first threshold value ⟍ 1620

Select a second LNA configuration responsive to the determining, where the second LNA configuration provides that the first SIM controls a first subset of LNAs associated with a first subset of the two or more antenna ports, and the second SIM controls a second subset of LNAs associated with a second subset of the two or more antenna ports ⟍ 1625

Receive the first communications via the first subset of antenna ports using the first subset of LNAs ⟍ 1630

Receive the second communications via the second subset of antenna ports using the second subset of LNAs ⟍ 1635

FIG. 16     ⟍ 1600

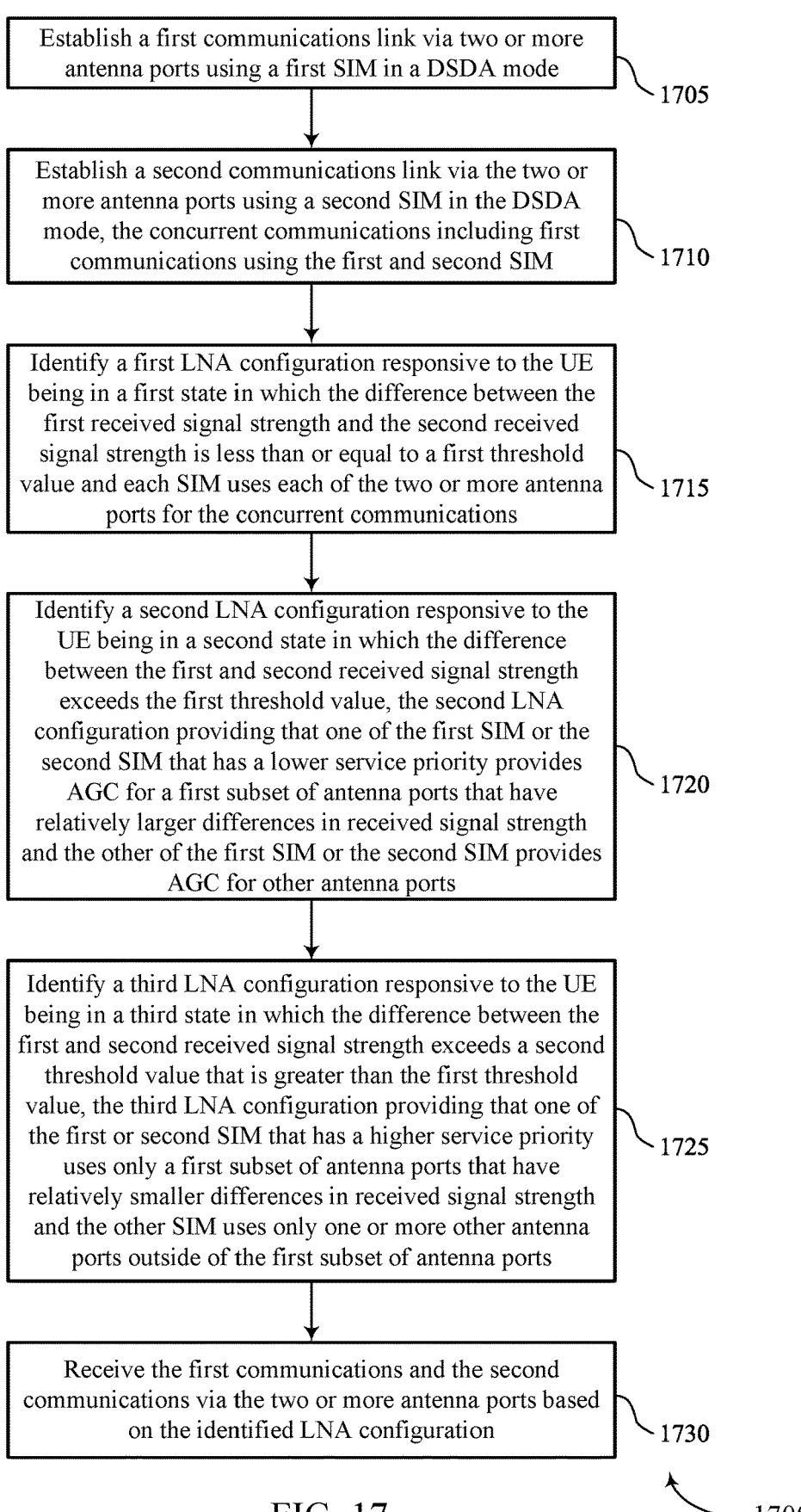

Establish a first communications link via two or more antenna ports using a first SIM in a DSDA mode

~1705

Establish a second communications link via the two or more antenna ports using a second SIM in the DSDA mode, the concurrent communications including first communications using the first and second SIM

~1710

Identify a first LNA configuration responsive to the UE being in a first state in which the difference between the first received signal strength and the second received signal strength is less than or equal to a first threshold value and each SIM uses each of the two or more antenna ports for the concurrent communications

~1715

Identify a second LNA configuration responsive to the UE being in a second state in which the difference between the first and second received signal strength exceeds the first threshold value, the second LNA configuration providing that one of the first SIM or the second SIM that has a lower service priority provides AGC for a first subset of antenna ports that have relatively larger differences in received signal strength and the other of the first SIM or the second SIM provides AGC for other antenna ports

~1720

Identify a third LNA configuration responsive to the UE being in a third state in which the difference between the first and second received signal strength exceeds a second threshold value that is greater than the first threshold value, the third LNA configuration providing that one of the first or second SIM that has a higher service priority uses only a first subset of antenna ports that have relatively smaller differences in received signal strength and the other SIM uses only one or more other antenna ports outside of the first subset of antenna ports

~1725

Receive the first communications and the second communications via the two or more antenna ports based on the identified LNA configuration

TECHNIQUES TO CONFIGURE LOW NOISE AMPLIFIER FOR DUAL-SUBSCRIBER DUAL-ACTIVE USER EQUIPMENT

FIELD OF TECHNOLOGY

The following relates to wireless communications, including techniques to configure low noise amplifier for dual-subscriber dual-active user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a UE may be capable of supporting multiple subscriber identification module (SIM) cards, each associated with a unique network subscription, and the UE may communicate with multiple service providers using the multiple SIM cards.

SUMMARY

The described techniques relate to improved methods, systems, devices, and apparatuses that support techniques to configure low noise amplifier for dual-subscriber dual-active (DSDA) user equipment. For example, the described techniques provide for selection of low noise amplifier (LNA) configurations for communications associated with multiple subscriber identification modules (SIMs) using a DSDA configuration. In some cases, a UE operating in a DSDA configuration may determine a difference in received signal strengths (e.g., based on a received signal strength indicator (RSSI)) between SIMs, and select a LNA configuration based on the difference. In some cases, different LNA configurations may be selected based on an amount of power imbalance between different SIMs. For example, in a first power imbalance region a first LNA configuration may provide that each SIM uses signals from each antenna port and LNA gains are set based on the stronger SIM. In a second power imbalance region a fallback mode may be entered in which the lower strength SIM is used to control LNA gain for one or more antenna ports. The fallback mode may use different gain control options, such as having the stronger SIM control gain for a first subset of antenna ports and the weaker SIM control gain for a second subset of antenna ports. Further, depending on a level of the imbalance, the stronger SIM may tune away on the second subset of antenna ports to avoid saturating the signals of the weaker SIM.

A method for wireless communication at a user equipment (UE) is described. The method may include establishing a first communications link via two or more antenna ports using a first SIM of the UE in a dual-subscriber dual-active mode, establishing a second communications link via the two or more antenna ports using a second SIM of the UE in the dual-subscriber dual-active mode, the dual-subscriber dual-active mode for receiving concurrent communications for at least the first SIM and the second SIM via the two or more antenna ports of the UE, the concurrent communications including first communications using the first SIM and second communications using the second SIM, identifying a low noise amplifier configuration from two or more available low noise amplifier configurations for receiving each of the first communications and the second communications based on activation of the dual-subscriber dual-active mode, the identifying based on a difference between a first received signal strength associated with the first communications and a second received signal strength associated with the second communications, and receiving the first communications and the second communications via the two or more antenna ports based on the identified low noise amplifier configuration.

An apparatus for wireless communication at a UE is described. The apparatus may include a processor, memory coupled with the processor, and instructions stored in the memory. The instructions may be executable by the processor to cause the apparatus to establish a first communications link via two or more antenna ports using a first SIM of the UE in a dual-subscriber dual-active mode, establish a second communications link via the two or more antenna ports using a second SIM of the UE in the dual-subscriber dual-active mode, the dual-subscriber dual-active mode for receiving concurrent communications for at least the first SIM and the second SIM via the two or more antenna ports of the UE, the concurrent communications including first communications using the first SIM and second communications using the second SIM, identify a low noise amplifier configuration from two or more available low noise amplifier configurations for receiving each of the first communications and the second communications based on activation of the dual-subscriber dual-active mode, the identifying based on a difference between a first received signal strength associated with the first communications and a second received signal strength associated with the second communications, and receive the first communications and the second communications via the two or more antenna ports based on the identified low noise amplifier configuration.

Another apparatus for wireless communication at a UE is described. The apparatus may include means for establishing a first communications link via two or more antenna ports using a first SIM of the UE in a dual-subscriber dual-active mode, means for establishing a second communications link via the two or more antenna ports using a second SIM of the UE in the dual-subscriber dual-active mode, the dual-subscriber dual-active mode for receiving concurrent communications for at least the first SIM and the second SIM via the two or more antenna ports of the UE, the concurrent communications including first communications using the first SIM and second communications using the second SIM, means for identifying a low noise amplifier configuration from two or more available low noise amplifier configurations for receiving each of the first communications and the second communications based on activation of the dual-subscriber dual-active mode, the identifying based on a difference between a first received signal strength associated with the first communications and a second received signal strength associated with the second communications, and means for receiving the first communications and the second communications via the two or more antenna ports based on the identified low noise amplifier configuration.

A non-transitory computer-readable medium storing code for wireless communication at a UE is described. The code may include instructions executable by a processor to establish a first communications link via two or more antenna ports using a first SIM of the UE in a dual-subscriber dual-active mode, establish a second communications link via the two or more antenna ports using a second SIM of the UE in the dual-subscriber dual-active mode, the dual-subscriber dual-active mode for receiving concurrent communications for at least the first SIM and the second SIM via the two or more antenna ports of the UE, the concurrent communications including first communications using the first SIM and second communications using the second SIM, identify a low noise amplifier configuration from two or more available low noise amplifier configurations for receiving each of the first communications and the second communications based on activation of the dual-subscriber dual-active mode, the identifying based on a difference between a first received signal strength associated with the first communications and a second received signal strength associated with the second communications, and receive the first communications and the second communications via the two or more antenna ports based on the identified low noise amplifier configuration.

In some examples of the method, apparatuses, and non-transitory computer-readable medium described herein, the identifying the low noise amplifier configuration may include operations, features, means, or instructions for measuring the first received signal strength associated with the first communications and the second received signal strength associated with the second communications to determine a difference between the first received signal strength and the second received signal strength, selecting, responsive to the difference between the first received signal strength and the second received signal strength being less than or equal to a first threshold value, a first low noise amplifier configuration in which each of the first SIM and the second SIM use each of a set of multiple low noise amplifiers associated with a set of antenna ports that receive both the first communications and the second communications, and selecting, responsive to the difference between the first received signal strength and the second received signal strength exceeding the first threshold value, a second low noise amplifier configuration in which the first SIM controls a first subset of low noise amplifiers associated with a first subset of the set of antenna ports, and the second SIM controls a second subset of low noise amplifiers associated with a second subset of the set of antenna ports.

In some examples of the method, apparatuses, and non-transitory computer-readable medium described herein, the first subset of low noise amplifiers and the second subset of low noise amplifiers is determined based on a magnitude of the difference between the first received signal strength and the second received signal strength. In some examples of the method, apparatuses, and non-transitory computer-readable medium described herein, the first SIM controls a gain of each of the set of multiple low noise amplifiers in the first low noise amplifier configuration. In some examples of the method, apparatuses, and non-transitory computer-readable medium described herein, the first SIM controls a gain of each of the first subset of low noise amplifiers, and the second SIM controls the gain of each of the second subset of low noise amplifiers, in the second low noise amplifier configuration. In some examples of the method, apparatuses, and non-transitory computer-readable medium described herein, the first SIM uses signals from each antenna port of the first subset of antenna ports and the second subset of antenna ports for receiving the first communications when the second low noise amplifier configuration is selected.

In some examples of the method, apparatuses, and non-transitory computer-readable medium described herein, the first SIM does not use any of the antenna ports of the second subset of antenna ports for receiving the first communications when the second low noise amplifier configuration is selected. In some examples of the method, apparatuses, and non-transitory computer-readable medium described herein, the first SIM does not use any of the antenna ports of the second subset of antenna ports for receiving the first communications when the second low noise amplifier configuration is selected, and the second SIM does not use any of the antenna ports of the first subset of antenna ports for receiving the second communications when the second low noise amplifier configuration is selected.

In some examples of the method, apparatuses, and non-transitory computer-readable medium described herein, the identified low noise amplifier configuration provides for control of a set of multiple low noise amplifiers at the UE, the set of multiple low noise amplifiers include two or more internal low noise amplifiers that are internal to a wireless modem of the UE and two or more external low noise amplifiers that are external to the wireless modem of the UE, and where the first communications link and the second communications link each include one or more component carriers.

In some examples of the method, apparatuses, and non-transitory computer-readable medium described herein, radio frequency signals from each of the two or more external low noise amplifiers may be split and provided to respective first internal low noise amplifiers associated with the first SIM and second internal low noise amplifiers associated with the second SIM. In some examples of the method, apparatuses, and non-transitory computer-readable medium described herein, radio frequency signals from each of the two or more external low noise amplifiers are provided to an associated internal low noise amplifier, and an output from each of the two or more internal low noise amplifiers is split and provided to separate processing chains associated with the first SIM and the second SIM.

In some examples of the method, apparatuses, and non-transitory computer-readable medium described herein, the first SIM controls an automatic gain control for at least a first subset of the set of multiple low noise amplifiers, and the second SIM controls the automatic gain control for at least a second subset of the set of multiple low noise amplifiers, and where a timing for updating the automatic gain control is based on which of the first SIM or the second SIM controls the associated low noise amplifier.

In some examples of the method, apparatuses, and non-transitory computer-readable medium described herein, the identifying the low noise amplifier configuration may include operations, features, means, or instructions for determining that the difference between a first received signal strength associated with the first communications and a second received signal strength associated with the second communications exceeds a threshold value and selecting, responsive to the determining, a low noise amplifier configuration in which the first SIM controls at least one of the two or more internal low noise amplifiers and at least one of the two or more external low noise amplifiers, and in which the second SIM controls at least one of the two or more internal low noise amplifiers. In some examples of the method, apparatuses, and non-transitory computer-readable medium described herein, the threshold value is based on a gain control or dynamic tuning range of the two or more internal low noise amplifiers.

Some examples of the method, apparatuses, and non-transitory computer-readable medium described herein may further include operations, features, means, or instructions for determining that the first SIM may have a higher priority than the second SIM and mapping a first subset of the two or more antenna ports to the first SIM based on the higher priority of the first SIM, and where the low noise amplifier configuration is based on the mapping. In some examples of the method, apparatuses, and non-transitory computer-readable medium described herein, the receiving may include operations, features, means, or instructions for setting one or more analog-to-digital converter (ADC) parameters for the first communications based on a frequency offset between the first communications and the second communications when the first communications may have a stronger signal strength than the second communications.

In some examples of the method, apparatuses, and non-transitory computer-readable medium described herein, the identifying includes identifying a first low noise amplifier configuration based on the difference between the first received signal strength and the second received signal strength being less than or equal to a first threshold value, the first low noise amplifier configuration providing that each SIM uses each antenna port, and associated low noise amplifiers for receiving the respective first and second communications, and where the method may include operations, features, means, or instructions for determining, subsequent to identifying the first low noise amplifier configuration, that the difference between the first received signal strength and the second received signal strength exceeds the first threshold value, selecting a second low noise amplifier configuration responsive to the determining, where the second low noise amplifier configuration provides that the first SIM controls a first subset of low noise amplifiers associated with a first subset of the two or more antenna ports, and the second SIM controls a second subset of low noise amplifiers associated with a second subset of the two or more antenna ports, receiving the first communications via the first subset of antenna ports using the first subset of low noise amplifiers, and receiving the second communications via the second subset of antenna ports using the second subset of low noise amplifiers.

In some examples of the method, apparatuses, and non-transitory computer-readable medium described herein, the difference between the first received signal strength and the second received signal strength are determined based on filtered received signal strength indicators (RSSIs) in a sliding window, the filtered RSSIs associated with the first communications and the second communications.

In some examples of the method, apparatuses, and non-transitory computer-readable medium described herein, the determining may include operations, features, means, or instructions for determining that the difference between the first received signal strength and the second received signal strength exceeds the first threshold value on a predetermined number of occasions within a predetermined time period.

Some examples of the method, apparatuses, and non-transitory computer-readable medium described herein may further include operations, features, means, or instructions for determining, subsequent to the selection of the second low noise amplifier configuration, that the difference between the first received signal strength and the second received signal strength is less than or equal to a second threshold value, selecting the first low noise amplifier configuration responsive to the determining that the difference between the first received signal strength and the second received signal strength is less than or equal to a second threshold value, and receiving the first communications and the second communications via the two or more antenna ports based on the first low noise amplifier configuration. In some examples of the method, apparatuses, and non-transitory computer-readable medium described herein, the second threshold value is less than the first threshold value.

In some examples of the method, apparatuses, and non-transitory computer-readable medium described herein, the first SIM controls a set of multiple low noise amplifiers in the first low noise amplifier configuration during periods in which the first SIM is not in a sleep mode, and the second SIM controls the set of multiple low noise amplifiers in the first low noise amplifier configuration during periods in which the first SIM is in the sleep mode. In some examples of the method, apparatuses, and non-transitory computer-readable medium described herein, the first SIM suspends communications during one or more slots based on a timing drift associated with the first communications or a time division duplexing (TDD) configuration mismatch between the first communications and the second communications.

In some examples of the method, apparatuses, and non-transitory computer-readable medium described herein, a first low noise amplifier configuration of the two or more available low noise amplifier configurations is identified for receiving the first communications and the second communications based on the difference between the first received signal strength and the second received signal strength being less than or equal to a first threshold value, the first low noise amplifier configuration providing that each SIM uses each antenna port and associated low noise amplifiers for receiving the respective first and second communications and where gain control for each of the associated low noise amplifiers are controlled by the first SIM when the first received signal strength exceeds the second received signal strength.

In some examples of the method, apparatuses, and non-transitory computer-readable medium described herein, the identifying may include operations, features, means, or instructions for identifying a first low noise amplifier configuration responsive to the UE being in a first state in which the difference between the first received signal strength and the second received signal strength is less than or equal to a first threshold value and each SIM uses each of the two or more antenna ports for the concurrent communications, identifying a second low noise amplifier configuration responsive to the UE being in a second state in which the difference between the first received signal strength and the second received signal strength exceeds the first threshold value, the second low noise amplifier configuration providing that one of the first SIM or the second SIM that may have a lower service priority provides gain control for a first subset of the two or more antenna ports that may have relatively larger differences in received signal strength and the other of the first SIM or the second SIM provides gain control for other antenna ports outside of the first subset of the two or more antenna ports, and identifying a third low noise amplifier configuration responsive to the UE being in a third state in which the difference between the first received signal strength and the second received signal strength exceeds a second threshold value that is greater than the first threshold value, the third low noise amplifier configuration providing that one of the first SIM or the second SIM that may have a higher service priority uses only a first subset of the two or more antenna ports that may have relatively smaller differences in received signal strength and the other of the first SIM or the second SIM uses only one or more other antenna ports outside of the first subset of the two or more antenna ports.

BRIEF DESCRIPTION OF THE DRAWINGS

FIGS. 3A, 3B, and 3C illustrate examples of receive chain configurations that supports techniques to configure LNA for DSDA user equipment in accordance with one or more aspects of the present disclosure.

FIG. 6 illustrates an example of a state diagram of fallback modes that supports techniques to configure LNA for DSDA user equipment in accordance with one or more aspects of the present disclosure.

FIGS. 11 through 17 illustrate flowcharts showing methods that support techniques to configure LNA for DSDA user equipment in accordance with one or more aspects of the present disclosure.

DETAILED DESCRIPTION

Figure 1:
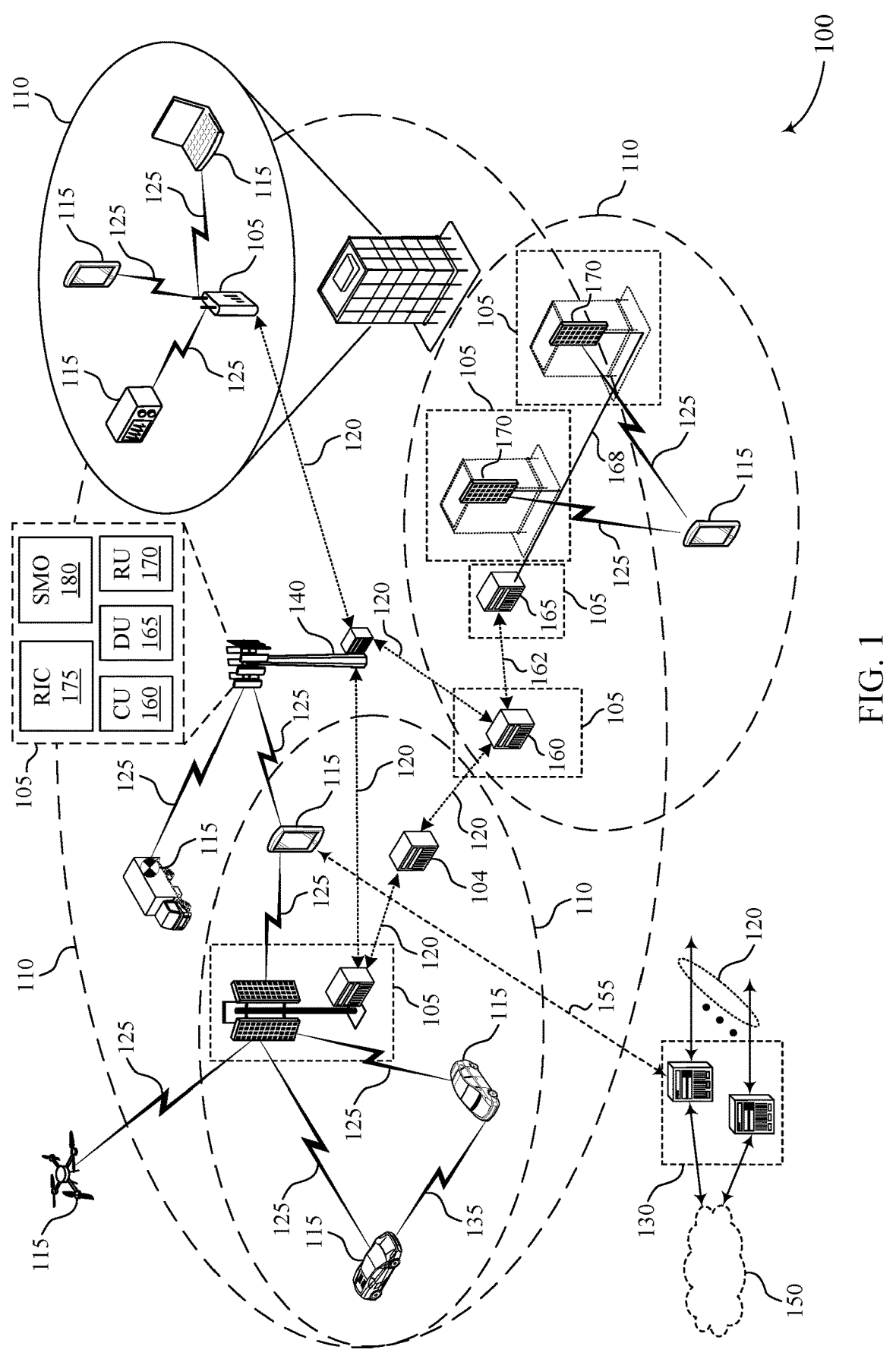
FIG. 1 illustrates an example of a wireless communications system that supports techniques to configure low noise amplifier for dual-subscriber dual-active (DSDA) user equipment in accordance with one or more aspects of the present disclosure.

In some wireless communications systems, a user equipment (UE) may include two or more subscriber identification modules (SIMs), where each SIM is associated with a different connection through which the UE may communicate. For example, a first SIM may support communications with a first mobile network operator (MNO) and a second SIM may support communications with a second MNO. In other examples, different SIMs may be associated with a same operator (e.g., the first MNO), in a co-band dual-SIM dual-active (DSDA) configuration. Thus, in some cases, UEs may support having each of two or more SIMs active concurrently in accordance with DSDA operation, where a first subscriber and second subscriber (e.g., a first SIM and second SIM, which may also be referred to as a first sub and second sub) in connected mode can share RF resources such as RF components and baseband resources. RF components may include RF front-end devices such as transmit chains, transmit power amplifiers (PAs), receive chains, antenna switches, antennas, band select switches, receive low noise amplifiers (LNAs), and the like. Baseband resources may include processing resources (e.g., computational resources) and memory resources that provide computations for maintenance of one or more communication links of the UE, enhancement in quality of the one or more communication links, or any combinations thereof. While various examples discussed herein relate to cellular wireless communications, the described techniques may be used in any type of system in which RF receive components of a UE are shared for communications with two or more separate networks such as, for example, wireless local area networks (WLANs) accessed by a UE via associated access points.

In some cases, in order to reduce costs, hardware component space, and processing capacity, multiple SIMs may share a same set of RF components (e.g., antennas, LNAs, etc.). In some examples, the receive components may include one or more LNAs that are associated with one or more antenna ports, with a same set of automatic gain control (AGC) settings used for each SIM. Such component sharing and LNA configurations provide for effective communications when each SIM has associated receive signals that have similar power levels. However, in some cases one SIM may be closer to its serving cell than another SIM, which can result in relatively large power imbalances of signals for each SIM. In some existing systems, stronger signals may be used to set LNA gain, which may result in reduced reliability for decoding weaker signals. Further, in some cases, the weaker signals may carry higher priority information, and setting LNA gain based on the stronger signal may impact reliability of the higher priority information. Additionally, if a SIM with weaker signals were to be used to set LNA gain, it may result in LNA saturation of the stronger signals.

In accordance with various aspects discussed herein, enhancements to DSDA operation using shared RF components are provided. In some aspects, a UE operating in a DSDA configuration may determine a difference in received signal strengths (e.g., based on a received signal strength indicator (RSSI)) between SIMs, and select a LNA configuration based on the difference. In some cases, two or more power imbalance regions may be defined (e.g., hard coded at the UE wireless modem, or configurable by the UE manufacturer), and different LNA configurations selected based on the amount of power imbalance. For example, in a first power imbalance region where a difference in signal strengths is less than a threshold value (e.g., a RSSI difference between SIMs of $\leq$ 10 dB) a first LNA configuration (e.g., a default configuration) may be used in which each SIM uses signals from each antenna port and LNA gains are set based on the stronger SIM. In a second power imbalance region where a difference in signal strengths is greater than the threshold value (e.g., a RSSI difference between SIMs of >10 dB) a fallback mode may be entered in which the lower strength SIM is used to control LNA gain for one or more antenna ports. The fallback mode may use different gain control options, such as having the stronger SIM control gain for a first subset of antenna ports and the weaker SIM control gain for a second subset of antenna ports. Further, depending on a level of the imbalance, the stronger SIM may tune away on the second subset of antenna ports to avoid saturating the signals of the weaker SIM.

Various aspects of the subject matter described in this disclosure may be implemented to realize one or more of the following potential advantages. For example, based on implementing the techniques of the present disclosure, the UE may use RF component configurations for two or more SIMs in which a LNA configuration is selected to provide efficient communications at the UE based on signal strength differences of the SIMs. For example, providing control for the gain control settings of LNAs based on conditions at the UE may allow for a UE to gain control for different SIMs based on current conditions at each SIM. Such techniques may thus enhance UE efficiency, increase data rates, enhance reliability at each SIM, and provide for enhanced user experience.

Aspects of the disclosure are initially described in the context of wireless communications systems. Aspects of the disclosure are further illustrated by and described with reference to receive chain configurations, state diagrams, apparatus diagrams, system diagrams, and flowcharts that relate to techniques to configure LNA for DSDA user equipment.

FIG. 1 illustrates an example of a wireless communications system 100 that supports techniques to configure LNA for DSDA user equipment in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques to configure LNA for DSDA user equipment as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers)

compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In accordance with various aspects, one or more UEs 115 may include two or more SIMs, and may select an LNA configuration for communications associated with multiple SIMs using a DSDA configuration in accordance with techniques discussed herein. In some cases, a UE 115 operating in a DSDA configuration may determine a difference in received signal strengths (e.g., based on a RSSI) between SIMs, and select a LNA configuration from two or more different LNA configurations based on the difference. In some cases, different LNA configurations may be selected based on an amount of power imbalance between different SIMs. For example, in a first power imbalance region a first LNA configuration may provide that each SIM uses signals from each antenna port and LNA gains are set based on the stronger SIM. In a second power imbalance region a fallback mode may be entered in which the lower strength SIM is used to control LNA gain for one or more antenna ports. The fallback mode may use different gain control options, such as having the stronger SIM control gain for a first subset of antenna ports and the weaker SIM control gain for a second subset of antenna ports. Further, depending on a level of the imbalance, the stronger SIM may tune away on the second subset of antenna ports to avoid saturating the signals of the weaker SIM.

Figure 2:
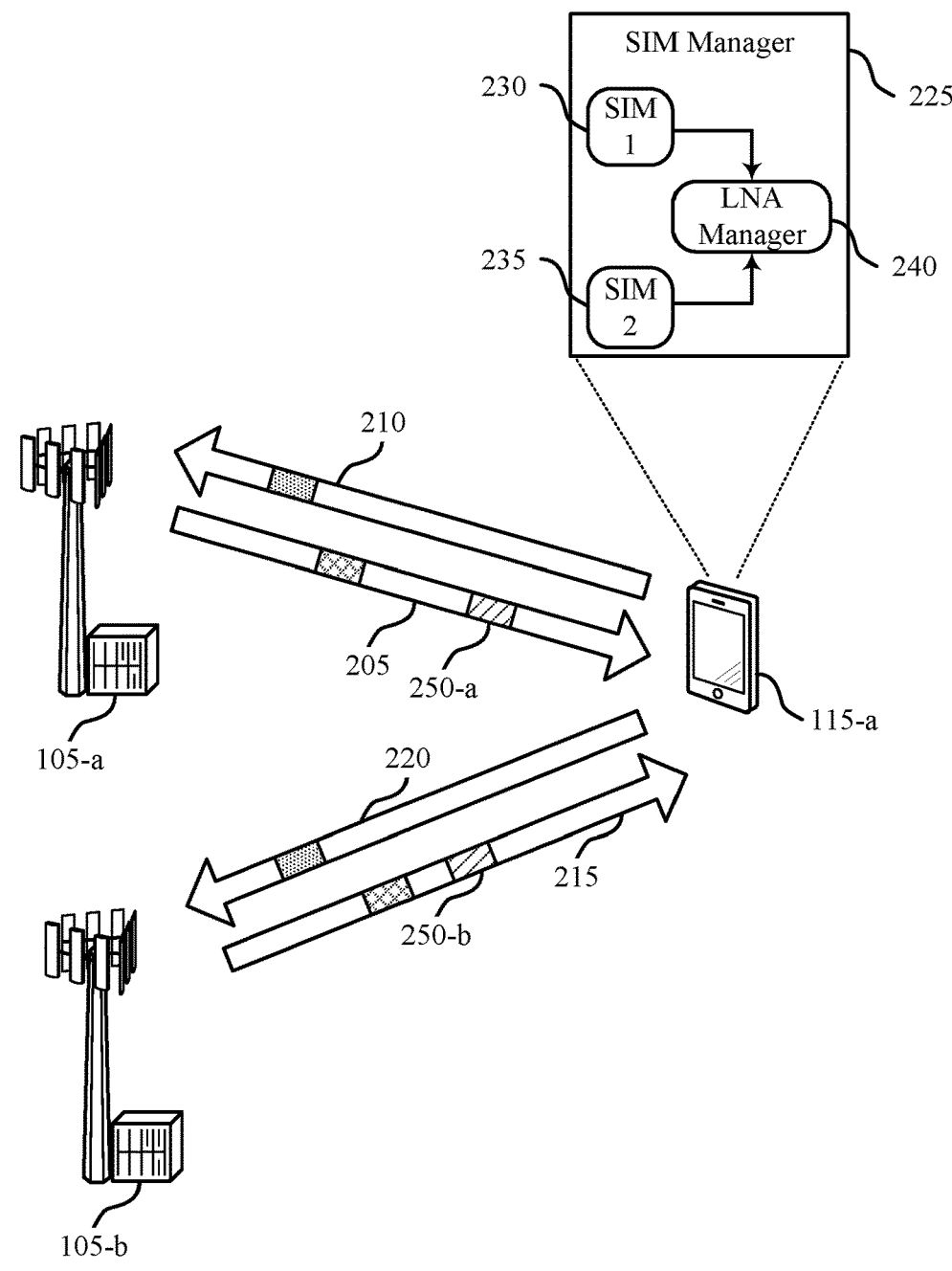
FIG. 2 illustrates an example of a wireless communications system that supports techniques to configure LNA for DSDA user equipment in accordance with one or more aspects of the present disclosure.

FIG. 2 illustrates an example of a wireless communications system 200 that supports techniques to configure LNA for DSDA user equipment in accordance with one or more aspects of the present disclosure. In the example of FIG. 2, wireless communications system 200 may include first network entity 105-a, a second network entity 105-b, and UE 115-a, which may be examples of the corresponding devices described with respect to FIG. 1. The first network entity 105-a may provide communications for a first network or first cell associated with a first SIM 230 at the UE 115-a, and the second network entity 105-b may provide communications for a second network or second cell associated with a second SIM 235 at the UE 115-a. The first network entity 105-a may transmit downlink communications 205 (e.g., via one or more component carriers) to the UE 115-a, and the UE 115-a may transmit uplink communications 210 (e.g., via one or more component carriers) to the first network entity 105-a, where the downlink communications 205 and uplink communications 210 are associated with the first SIM 230. Likewise, the second network entity 105-b may transmit downlink communications 215 (e.g., via one or more component carriers) to the UE 115-a, and the UE 115-a may transmit uplink communications 220 (e.g., via one or more component carriers) to the second network entity 105-b, where the downlink communications 215 and uplink communications 220 are associated with the second SIM 235. The first SIM 230 and the second SIM 235, may be managed by SIM manager 225 of the UE 115-a.

To support communications between first network entity 105-a, second network entity 105-b, and UE 115-a, each network entity 105 may transmit one or more reference signals 250 (e.g., channel state information (CSI) reference signals, synchronization signal blocks (SSBs), demodulation reference signals (DMRSs), tracking reference signals (TRSs), and the like, in one or more downlink transmissions 255). The UE 115-*a* may measure one or more metrics of received reference signals 250 and provide measurement reports (e.g., in an uplink transmission 260) to the network entities 105. In some cases, the SIM manager 225 may include an LNA manager 240, and the UE 115-*a* may determine a LNA configuration for concurrent DSDA communications based on one or more metrics from the measurements of the reference signals 250, one or more properties of communications associated with each SIM, and a set of available RF components at the UE 115-*a* that are available to each SIM.

For example, the first SIM 230 and the second SIM 235 may operate according to a DSDA configuration. Such a DSDA configuration may provide the UE with enhanced capability for multiple different communications with multiple different network entities 105 in a concurrent manner. In order to reduce costs and hardware component space, in some cases two or more SIMs may share a same set of RF components (e.g., antenna ports, LNAs, switches, baseband processing resources, etc.). Techniques such as discussed herein may provide a LNA configuration at the UE 115-*a* that is based on the one or more metrics from the measurements of the reference signals 250. In some cases, the UE 115-*a*, when operating in the DSDA configuration, may determine a difference in received signal strengths (e.g., based on RSSI) between reference signal 250-*a* of the first network entity 105-*a* and reference signal 250-*b* of the second network entity 105-*b*, and the LNA manager 240 may select a LNA configuration based on the difference. In some cases, two or more power imbalance regions may be defined (e.g., hard coded at a wireless modem of the UE 115-*a*, or configurable by a manufacturer of the UE 115-*a*), and different LNA configurations may be selected based on the amount of power imbalance.

For example, in a first power imbalance region where a difference in signal strengths is less than a threshold value (e.g., a RSSI difference of ≤ 10 dB) a first LNA configuration (e.g., a default configuration) may be used in which both the first SIM 230 and the second SIM 235 each use signals from a same antenna port, and LNA gains are set based on which of the first SIM 230 or the second SIM 235 has a higher measured signal strength. In a second power imbalance region where a difference in signal strengths is greater than the threshold value (e.g., a RSSI difference of >10 dB) a fallback mode may be entered in which the lower strength SIM is used to control LNA gain for one or more antenna ports. The fallback mode may use different gain control options, such as having the stronger SIM control gain for a first subset of antenna ports and the weaker SIM control gain for a second subset of antenna ports. Further, depending on a level of the imbalance, the stronger SIM may tune away on the second subset of antenna ports to avoid saturating the signals of the weaker SIM. Various examples of LNA configurations and fallback modes are discussed with reference to FIGS. 3 through 6.

FIGS. 3A, 3B, and 3C illustrate examples of receive chain configurations 300 that support techniques to configure LNA for DSDA user equipment in accordance with one or more aspects of the present disclosure. In some examples, the receive chain configurations 300 may be implemented by or may implement aspects of wireless communications system 100 or 200, as described with reference to FIGS. 1 and 2. In some examples, configurations illustrated in FIGS. 3A through 3C may be implemented by a transmitting device (e.g., a UE) that supports concurrent communication on multiple SIMs (e.g., with one or more cellular networks or WLANs), as described herein. The configurations may be implemented by a UE or its components as described herein, or may be performed by a modem, a chipset, and/or communications manager as discussed herein. In some examples, a UE or associated components may execute a set of instructions to control the functional elements of the UE to perform the described functions. Additionally or alternatively, the UE may perform aspects of the described functions using special-purpose hardware.

FIG. 3A shows a first example receive chain configuration 300-*a*, in which multiple SIMs may share a LNA architecture. In this example, RF components that are shared among multiple SIMs may include an antenna element 305-*a*, a RF front end (RFFE) 310-*a*, and an external LNA (eLNA) 315-*a*. The eLNA 315-*a* may be external to a radio component 320-*a* (e.g., a radio portion of a wireless modem chip or chipset, which may provide a software defined radio (SDR)). An external LNA such as eLNA 315-*a* may provide additional gain control that, when used in conjunction with one or more internal LNAs (ILNAs) 325 (e.g., first iLNA 325-*a* and second iLNA 325-*b*) within the radio component 320-*a*, provides more versatile gain control and tolerance against cross-SIM imbalance. In this example, an output of eLNA 315-*a* may be split and provided to separate RF chains associated with different SIMs (e.g., a first RF chain for SUB1 and a second RF chain for SUB2). The first RF chain, in this example, includes first iLNA 325-*a*, a first mixer 330-*a* (e.g., that mixes the received signal with a local oscillator to generate a baseband signal), a first baseband filter (BBF) 335-*a*, and a first analog-to-digital converter (ADC) 340-*a*, which may be provided in radio component 320-*a* (e.g., in a SDR). The first RF chain may also include a wideband (WB) filter 345-*a* and a narrowband (NB) filter 350-*a*. The second RF chain associated with the second SIM may include second iLNA 325-*b*, a second mixer 330-*b*, a second BBF 335-*b*, and a second ADC 340-*b*, which may be provided in radio component 320-*a* (e.g., in a SDR). The second RF chain may also include a WB filter 345-*b* and a NB filter 350-*b*.

In other examples, an external LNA may not be present, and the output of an internal LNA may be split for different receive chains associated with different SIMs. FIG. 3B shows an example of such a receive chain configuration 300-*b*. In this example, RF components that are shared among multiple SIMs again may include an antenna element 305-*b* and a RFFE 310-*b*, which may be external to a radio component 320-*b* (e.g., a radio portion of a wireless modem chip or chipset, which may provide a SDR). In this example, an iLNA 325-*c* may receive the signal from the RFFE 310-*b*, and an output of the iLNA 325-*c* may be split and provided to separate RF chains associated with different SIMs (e.g., a first RF chain for SUB1 and a second RF chain for SUB2). The first RF chain, in this example, a first mixer 330-*c*, a first BBF 335-*c*, and a first ADC 340-*c*, which may be provided in radio component 320-*b* (e.g., in a SDR). The first RF chain may also include a WB filter 345-*c* and a NB filter 350-*c*. The second RF chain associated with the second SIM may include a second mixer 330-*d*, a second BBF 335-*d*, and a second ADC 340-*d*, which may be provided in radio component 320-*b* (e.g., in a SDR). The second RF chain may also include a WB filter 345-*d* and a NB filter 350-*d*.

FIG. 3C shows an example of a default receive chain configuration 300-*c*. In this example, signals from LNAs may not be split for different SIMs and all RF components of the receive chain may be shared among multiple SIMs, or the UE may downgrade to operation on only one SIM (e.g., in the case of severe imbalance, one SIM may be disabled, such as a lower priority SIM). Similarly as the other examples of FIGS. 3A and 3B, the RF components may include an antenna element 305-*c*, a RFFE 310-*c*, and an eLNA 315-*b*, which may be external to a radio component 320-*c* (e.g., a radio portion of a wireless modem chip or chipset, which may provide a SDR). In this example, an iLNA 325-*d* may receive the signal from the RFFE 310-*b* and provide an amplified signal to a mixer 330-*e*, a BBF 335-*e*, and an ADC 340-*e*, which may be provided in radio component 320-*c* (e.g., in a SDR). The RF chain of this example may also include a WB filter 345-*e* and a NB filter 350-*e*.

In some cases, a UE may configure or reconfigure the radio component 320 based on an amount of imbalance in received signal strength between different SIMs. As discussed herein, in cases where the imbalance is relatively high (e.g., exceeds a first threshold value, such as 10 dB), the radio component may be configured to provide a split in which signals from different LNAs (e.g., eLNA(s) 315, iLNA(s) 325, or any combinations thereof) may be split for processing associated with a particular SIM. In some cases, a UE may not include external LNAs, and received signal may be split at an iLNA 325 (e.g., as illustrated in the receive chain configuration 300-*b*). Thus, LNA configurations may be selected and updated based on the imbalance in received signal strength, which may enhance throughput and reliability by allowing more reliable signal processing of lower strength signals. Further, in some cases, LNA configuration may be based on a service priority associated with a SIM. For example, a high service priority SIM may be used for higher priority communications such as voice communications (e.g., VoNR) and have a weaker RSSI, and a lower service priority SIM may be used for lower priority communications (e.g., mobile broadband data communications that are relatively time insensitive) and have a stronger RSSI. In cases where each SIM uses a same band (e.g., intra-band or co-band DSDA), techniques such as discussed herein may provide configuration flexibility to enhance communications of the multiple SIMs while using shared RF components for the SIMs. In some cases, a hybrid scheme may be present, in which some receive paths may have an associated eLNA 315 and the output may be split for different SIMs, while other receive paths may have only an iLNA 325 which may have its output split for different SIMs. Examples of different LNA configurations and control techniques are discussed with reference to FIGS. 4 through 6.

Figure 4A:
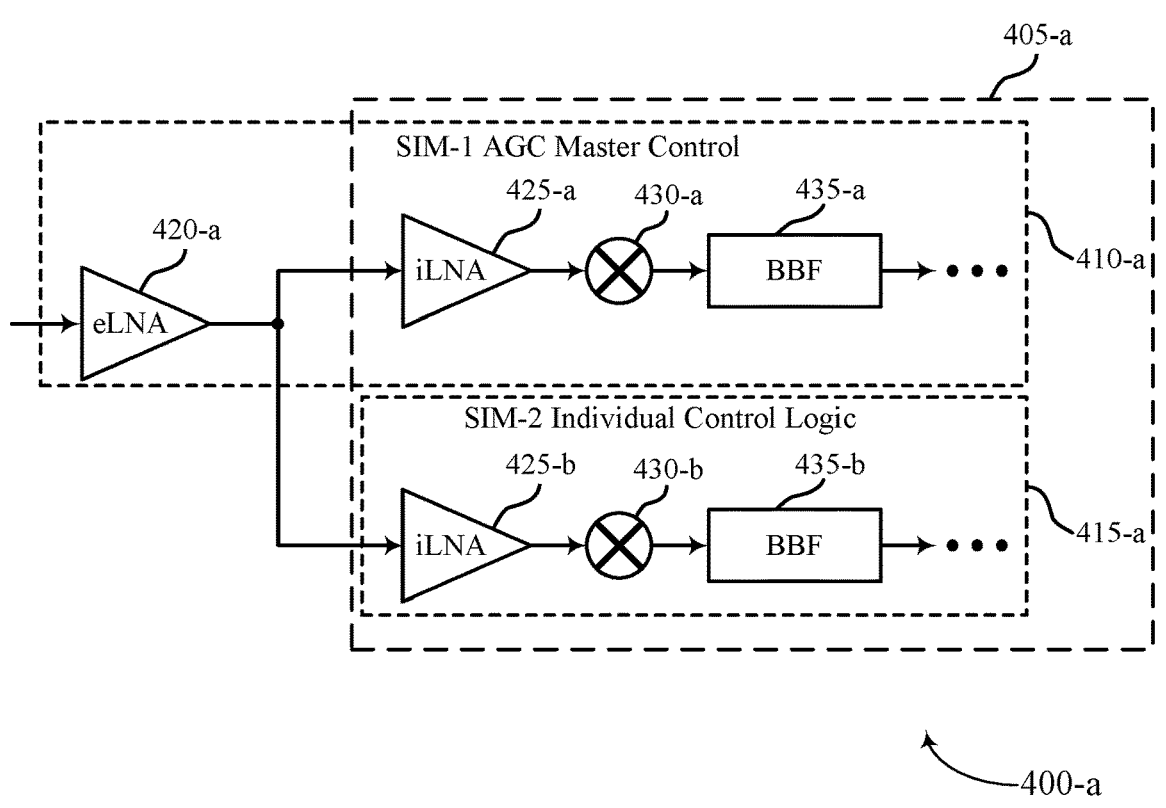
FIGS. 4A and 4B illustrate examples of a LNA control configurations that supports techniques to configure LNA for DSDA user equipment in accordance with one or more aspects of the present disclosure.
Figure 4B:
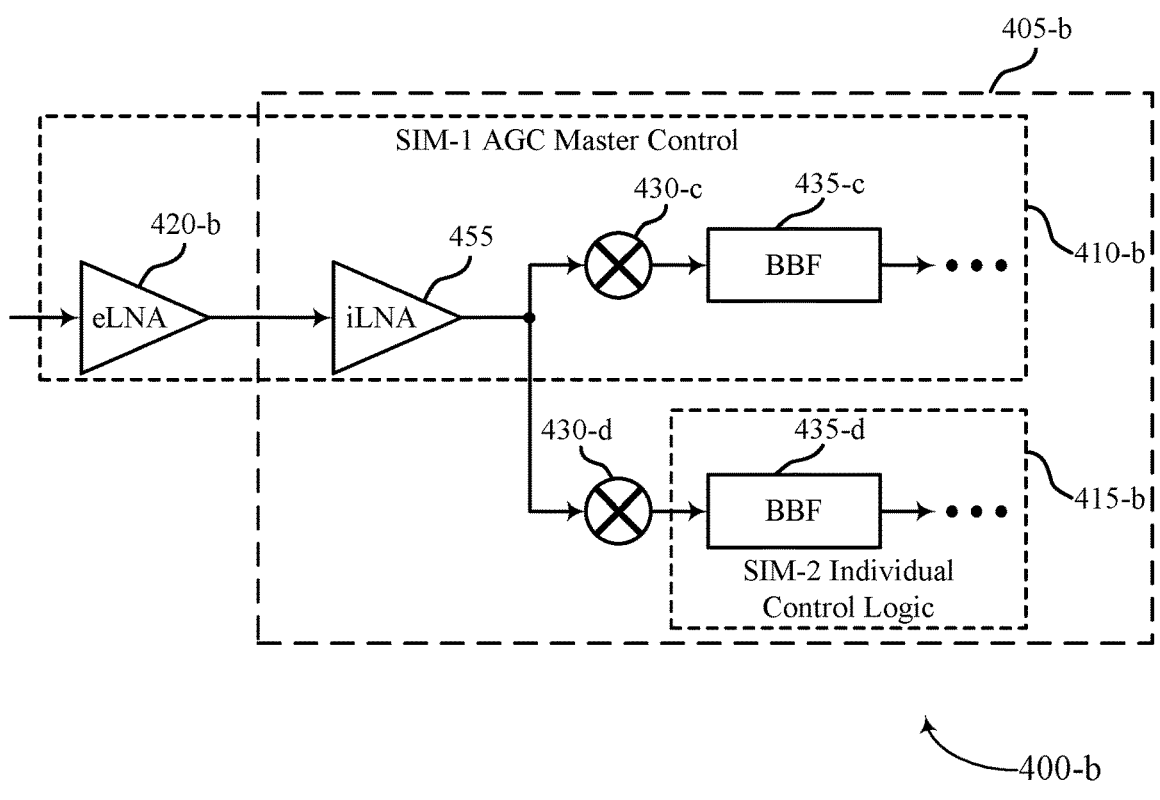

FIGS. 4A and 4B illustrates an example of a LNA control configurations 400 that supports techniques to configure LNA for DSDA user equipment in accordance with one or more aspects of the present disclosure. In some examples, the LNA control configurations 400 may be implemented by or may implement aspects of wireless communications system 100 or 200, as described with reference to FIGS. 1 and 2. In some examples, configurations illustrated in FIGS. 4A and 4B may be implemented by a transmitting device (e.g., a UE) that supports concurrent communication on multiple SIMs (e.g., with one or more cellular networks or WLANs) using receive chain configurations such as illustrated in FIGS. 3A through 3C, as described herein. The LNA control configurations may be implemented by a UE or its components as described herein, or may be performed by a modem, a chipset, and/or communications manager as discussed herein. In some examples, a UE or associated components may execute a set of instructions to control the functional elements of the UE to perform the described functions. Additionally or alternatively, the UE may perform aspects of the described functions using special-purpose hardware.

In the example of FIG. 4A, a first LNA control configuration 400-*a* may provide an eLNA 420-*a* split, in which an amplified signal from eLNA 420-*a* is split for a first RF chain 410-*a* associated with a first SIM and a second RF chain 415-*a* associated with a second SIM. In this example, the first RF chain may include an iLNA 425-*a*, a mixer 430-*a*, and a BBF 435-*a* that are each associated with the first SIM. Likewise, the second RF chain may include an iLNA 425-*b*, a mixer 430-*b*, and a BBF 435-*b* that are each associated with the second SIM. As discussed herein, components of the RF chains 410-*a* and 415-*a* may be implemented in a radio component 405-*a* (e.g., a radio portion of a wireless modem chip or chipset, which may provide a SDR). In this example, the first SIM may have control to set automatic gain control (AGC) settings for the eLNA 420-*a*, as well as control to set AGC and parameters for other of the RF components of the first RF chain 410-*a*. The second SIM may have control to set AGC for the iLNA 425-*b* and parameters for other components of the second RF chain 415-*a* (e.g., BBF 435-*b*). In some cases, the SIM having stronger RSSI measurements may be set to be the first SIM, such that AGC settings of the eLNA 420-*a* are not saturated for the first SIM. In other cases, the SIM having higher priority communications may be set to be the first SIM.

In the example of FIG. 4B, separate iLNAs may not be available for an antenna port associated with the received signal, and a second LNA control configuration 400-*b* may provide an iLNA 455 split, in which an amplified signal from iLNA 455 is split for a first RF chain 410-*b* associated with a first SIM and a second RF chain 415-*b* associated with a second SIM. In this example, an eLNA 420-*b* may be present and the first RF chain 410-*b* may include iLNA 455, a mixer 430-*c*, and a BBF 435-*c* that are each associated with the first SIM. Likewise, the second RF chain may include a mixer 430-*d*, and a BBF 435-*d* that are each associated with the second SIM.

As discussed herein, components of the RF chains 410-*b* and 415-*b* may be implemented in a radio component 405-*b* (e.g., a radio portion of a wireless modem chip or chipset, which may provide a SDR). In this example, the first SIM may have control to set automatic gain control (AGC) settings for the eLNA 420-*b*, as well as control to set AGC for iLNA 455 and parameters for other of the RF components of the first RF chain 410-*b*. The second SIM may have control to set parameters for other components of the second RF chain 415-*a* (e.g., BBF 435-*d*). In some cases, the SIM having stronger RSSI measurements may be set to be the first SIM, such that AGC settings of the eLNA 420-*b* are not saturated for the first SIM. In other cases, the SIM having higher priority communications may be set to be the first SIM.

In some cases, iLNA vs eLNA splits such as illustrated in first LNA control configuration 400-*a* may provide enhanced performance due to different gain control and dynamic tuning range. For example, the eLNA 420 may provide a range of >20 dB, and the iLNA(s) 425 and 455 may provide a range of 6 dB. In some cases, if a signal strength delta between the SUBs is relatively large, the weaker SIM may need a higher gain tuning range that an iLNA 425 and 455 may not be able to provide. In one example, SIMs with a 30 dB imbalance using the first LNA control configuration 400-*a* may use splitting at eLNA 420-*a* and have a 6 dB better peak signal to noise ratio (SNR), and with a 10 dB imbalance a peak SNR delta may be reduced to about 3 dB.

In cases with relatively low imbalance (e.g., 0 dB), ILNA splitting may provide peak SNR that is about same as eLNA (or even slightly better due to noise figure loss in eLNA split). Thus, in some examples, different LNA configuration fallback modes may be selected based on a difference or imbalance in signal strengths for each SIM. Examples of such fallback modes are illustrated in FIGS. 5 and 6.

Figure 5:
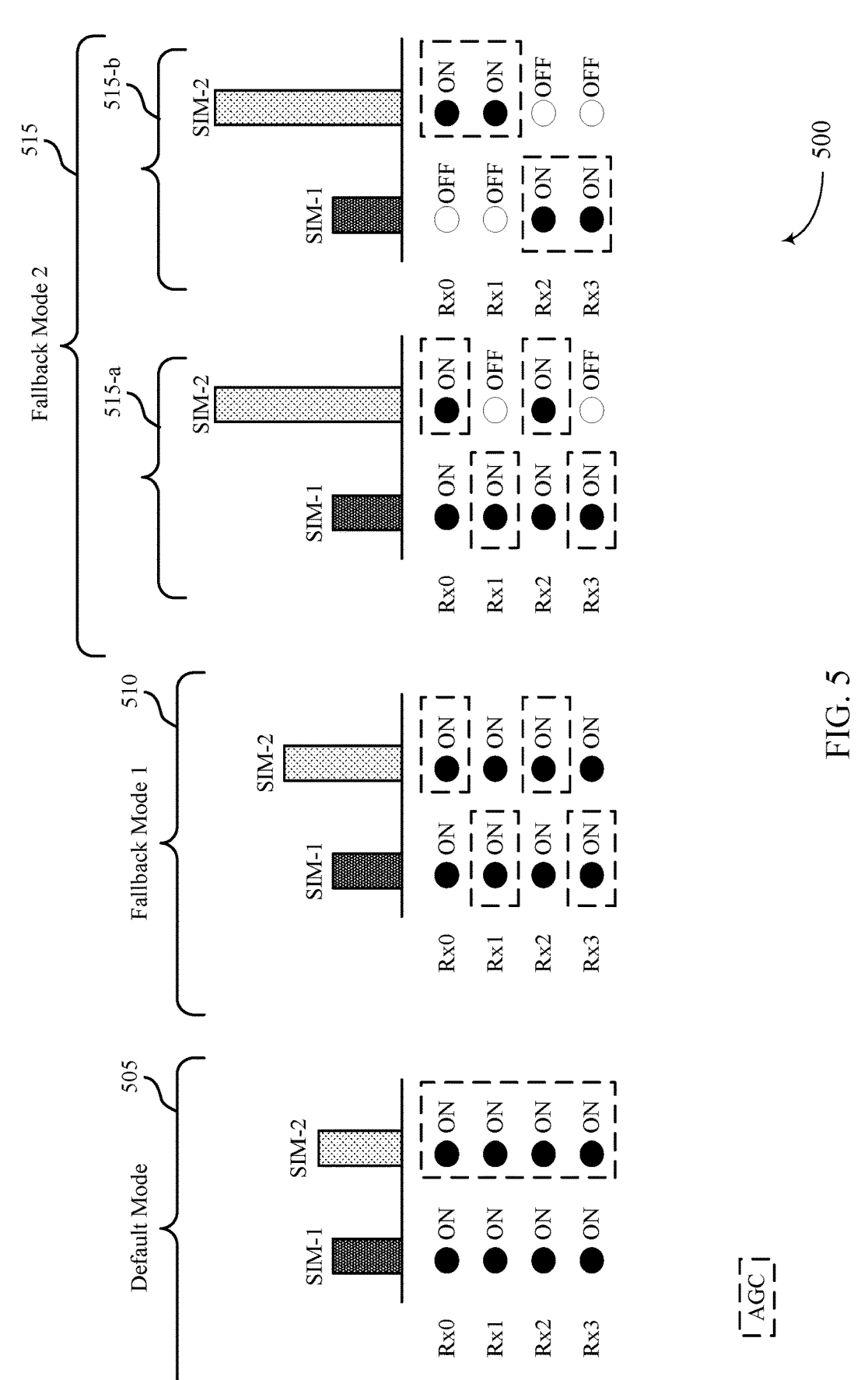
FIG. 5 illustrates exemplary fallback modes that support techniques to configure LNA for DSDA user equipment in accordance with one or more aspects of the present disclosure.

FIG. 5 illustrates an example of a fallback modes 500 that supports techniques to configure LNA for DSDA user equipment in accordance with one or more aspects of the present disclosure. In some examples, the fallback modes 500 may be implemented by or may implement aspects of wireless communications system 100 or 200, as described with reference to FIGS. 1 and 2. In some examples, fallback modes illustrated in FIG. 5 may be implemented by a transmitting device (e.g., a UE) that supports concurrent communication on multiple SIMs (e.g., with one or more cellular networks or WLANs) using receive chain configurations such as illustrated in FIGS. 3A through 3C and FIGS. 4A and 4B, as described herein. The fallback modes 500 may be implemented by a UE or its components as described herein, or may be performed by a modem, a chipset, and/or communications manager as discussed herein. In some examples, a UE or associated components may execute a set of instructions to control the functional elements of the UE to perform the described functions. Additionally or alternatively, the UE may perform aspects of the described functions using special-purpose hardware.

In the example of FIG. 5, a default mode 505 may provide that each of a first SIM (SIM-1) and a second SIM (SIM-2) use each available receive antenna port and associated RF path (Rx0 through Rx3) using shared RF components associated with each antenna port, in which the SIM with a stronger signal strength controls AGC settings (e.g., SIM-2 in this example controls ACG). Such a default mode 505 may be used in cases where an imbalance in signal strengths between SIMs is relatively low (e.g., <10 dB). In this example, a first fallback mode 510 (fallback mode 1) may provide that the first SIM (SIM-1) controls AGC settings associated with a first subset of antenna ports and associated RF paths (e.g., Rx1 and Rx3), and the second SIM (SIM-2) controls AGC settings associated with a second subset of antenna ports and associated RF paths (e.g., Rx0 and Rx2). In the first fallback mode 510, each RF path may be active for each SIM.

Continuing with the example of FIG. 5, a second fallback mode 515 (fallback mode 2) may provide that each SIM controls AGC for different subsets of antenna ports and associated RF paths, and one or both SIMs may inactivate one or more RF paths. In a first example of the second fallback mode 515-a, the first SIM (SIM-1) controls AGC settings associated with a first subset of antenna ports and associated RF paths (e.g., Rx1 and Rx3), and the second SIM (SIM-2) controls AGC settings associated with a second subset of antenna ports and associated RF paths (e.g., Rx0 and Rx2). In the first example of the second fallback mode 515-a, each RF path may be active for the first SIM, and the non-controlled RF paths for the second SIM may be deactivated or blanked by the second SIM. In the second example of the second fallback mode 515-b, each SIM may deactivate or blank non-controlled RF paths.

In accordance with various aspects, a UE may select a LNA configuration using one of the modes such as illustrated in FIG. 5, in which LNAs (e.g., iLNAs and/or eLNAs) may be split or shared between SIMs based on an available hardware configuration that supports split or shared LNAs (eLNA and/or iLNA) and a fallback algorithm. In some cases, in a default shared LNA mode such as illustrated in default mode 505, the SIM with stronger received signals (e.g., SIM-2 in the example of FIG. 5 which has higher RSSI values than SIM-1 for one or more measured reference signals) drives the LNAs. Such a technique may enhance overall throughput with relatively low risk of LNA saturation. In some cases, when the default mode 505 is selected, the SNR of each SIM may be thermal dominated, and reciprocal mixing may be used at low offsets of RSSIs at each SIM.

In other cases, a fallback mode may be selected in which a SIM with weaker received signals (e.g., SIM-1 in the example of FIG. 5 which has lower RSSI values than SIM-1 for one or more measured reference signals) may drive at least a subset of the LNAs. In this example, the first fallback mode 510 may provide that AGC control on two RF paths (Rx1 and Rx3) are driven by the SIM with weaker received signals (e.g., SIM-2), and both SIMs may continue to use all RF paths for receive processing. Such a technique may result in saturation at one or more ADCs associated with the stronger SIM (e.g., SIM-1) for one or more RF path of the subset of LNAs that are controlled by the weaker sim (e.g., SIM-2). In some cases, the first fallback mode 510 may be used when a RSSI difference between SIMs exceeds a first threshold value (e.g., RSSI difference is greater than 10 dB). Using such a fallback mode may provide, for example, a fallback SNR for the first SIM of about 10 dB due to a lower thermal level, and may result in saturation of an ADC associated with the second SIM when a receive signal power is greater than −46 dBm. This technique may also risk saturation of an ADC associated with the second SIM if the second SIM SNR is 35 dB or more.

In the second fallback mode 515, the SIM with weaker signals may drive at least a subset of the LNAs (e.g., LNAs associated with Rx1 and Rx3), and the SIM with stronger signals may blank the baseband signal for each RF path associated with the subset of LNAs (e.g., Rx1 and Rx3). For example, in the first example of the second fallback mode 515-a, the stronger SIM may perform a RF level tune-away for RF paths associated with the subset of LNAs that are controlled by the weaker SIM. In some cases, one or more RSSI measurements of the stronger SIM may be frozen while the fallback algorithm operates in accordance with the second fallback mode 515 based on the RSSI delta between SIMs. In other examples, such as the second example of the second fallback mode 515-b, both SIMs may blank the baseband signal for each RF path that is not controlled by that SIM. Such techniques may avoid saturation for RF paths of the stronger SIM and reduce interference in RF paths of the weaker SIM. In some cases, the second fallback mode 515 may be used when a RSSI difference between SIMs exceeds a second threshold value (e.g., RSSI difference is greater than 30 dB or 35 dB for the first or second example of the second fallback mode). In some cases, the second fallback mode 515 may be used subsequent to a transition to the first fallback mode 510, or may be entered directly from the default mode 505, based on RSSI difference threshold values. Thus, in some cases, a UE may transmission between different LNA configuration modes, and an example of LNA configuration mode states and transitions between different states is illustrated in FIG. 6.

FIG. 6 illustrates an example of a state diagram 600 of fallback modes that supports techniques to configure LNA for DSDA user equipment in accordance with one or more aspects of the present disclosure. In some examples, the state diagram 600 may be implemented by or may implement aspects of wireless communications system 100 or 200, as described with reference to FIGS. 1 and 2. In some examples, state diagram 600 and fallback modes illustrated in FIG. 6 may be implemented by a transmitting device (e.g., a UE) that supports concurrent communication on multiple SIMs (e.g., with one or more cellular networks or WLANs) using receive chain configurations such as illustrated in FIGS. 3A through 3C and FIGS. 4A and 4B, as described herein. The state diagram 600 may be implemented by a UE or its components as described herein, or may be performed by a modem, a chipset, and/or communications manager as discussed herein. In some examples, a UE or associated components may execute a set of instructions to control the functional elements of the UE to perform the described functions. Additionally or alternatively, the UE may perform aspects of the described functions using special-purpose hardware.

In the example of FIG. 6, different states may be associated with a default mode 605, a first fallback mode 610, and a second fallback mode 615. Based on a difference in received signal strengths (e.g., RSSI) at each SIM, the UE may transition between different states. For example, the UE may perform a transition 620 from the default mode 605 to the first fallback mode 610 at time T1 655 based on a RSSI delta 650 between SIMs exceeding a first threshold value (e.g., 10 dB). In the event that the RSSI delta 650 drops below the first threshold value or below an offset associated with the first threshold value, the UE may perform a transition 625 to the default mode 605. When operating in the first fallback mode 610, the UE may perform a transition 630 from the first fallback mode 610 to the second fallback mode 615 at time T2 660 based on the RSSI delta 650 exceeding a second threshold value (e.g., 30 dB). In the event that the RSSI delta 650 drops below the second threshold value (or an offset associated with the second threshold value) and remains above the first threshold value, the UE may perform a transition 635 to the first fallback mode 610. Further, the UE may perform a transition 640 from the default mode 605 directly to the second fallback mode 615, or perform a transition 645 from the second fallback mode 615 directly to the default mode 605, based on the RSSI delta 650.

In some cases, one or more state transition rules may be defined for switching LNA configuration techniques. For example, transitions between the default mode 605 and the first fallback mode 610 may be defined in RF software, and transitions between the default mode 605 and the second fallback mode 615, or between the first fallback mode 610 and the second fallback mode 615, may be defined in RF software and in an interface between radio components and one or more external components. When operating in one of the fallback modes, the UE may perform antenna allocation based on one or more rules. In some cases, when operating in the first fallback mode 610, antenna allocation and the RF path AGC control for the antenna paths with highest RSSI deltas may be provided to the lower service priority SIM. Further, the RF path AGC control for the remaining antenna paths with may be provided to the higher service priority SIM. For the second fallback mode 615, for each antenna chain, the path corresponding to the lower RSSI delta SIM may be allocated to the higher priority service SIM. Further, for each antenna path, the path associated to the higher RSSI delta SIM may be allocated to the lower service priority SIM. In some cases, when operating in a fallback mode, the UE may not change the receive RF path allocation until the fallback mode is exited and the default mode 605 is resumed (e.g., even in the event of per SIM priority change).

As discussed herein, LNA configurations may be selected based on signal strengths of different SIMs that operate in using DSDA. In some cases, the SIM with stronger signals may risk saturation in the RF path due to a relatively small signal margin before BBF, and the associated AGC may prevent saturation at the associated ADC with no visibility into upstream BBF. In such cases, with no RF saturation, the first fallback mode 610 may provide higher baseband throughput, however operation in such a mode may reduce flexibility for antenna switching diversity (AsDIV), and the UE may be more susceptible to call drops due to hand blocking, for example. In some cases, in the RF path, a BBF gain adjustment may be used for split iLNA configurations, and wide adjustment ranges (e.g., more than 6 dB) may incur insertion loss.

In some cases, different SIMs may coordinate on physical to logical antenna mapping. For example, the SIMs may coordinate to map a higher service priority SIM to RF paths and associated antennas that have a smaller imbalance between SIMs. Additionally, or alternatively, the SIMs may coordinate to map a lower service priority SIM to RF paths and associated antennas that that have a larger imbalance. In some cases, AsDIV switching may use the same mapping (e.g., every 640 ms AsDIV is evaluated (although antenna receive diversity switching may be at 20 ms), and AsDIV may update the mapped RF paths and antennas). In some cases, a fallback mode may not interrupt, override, or affect AsDIV operations. In cases where an antenna and associated RF path is off or blanked by a SIM, transmission of one or more sounding reference signal (SRS) may be suspended. Service priority may be determined based on information provided from a communications manager. In some cases, when establishing connections, combined AGC leverage may be used for the complete flow, where both SIMs may be commonly scouted together, and the total RSSI may be determined based on RSSIs of each SIM. In some cases, timing of communications for each SIM may be synchronized, and timing may be driven by the higher service priority SIM.

In some cases, when using a hybrid LNA sharing configuration, in some band combinations a receive chain AGC may account for different AGC determination methods for separate subsets of RF paths. For example, a first subset of RF paths (e.g., Rx0, Rx1) may be driven by separate LNAs in different SIMs and a second subset of RF paths (e.g., Rx2, Rx3) may be driven by the same shared LNA for a different SIM, and the AGC control may account for the particular LNA configuration. In some cases, desense and blanking schemes for timing drift protection may be leveraged across SIMs in different fallback modes.

In some cases, different SIMs may enter and exit a sleep mode based on particular configurations associated with the SIMs. In some cases, if one SIM enters a sleep mode, the other SIM may assume control of LNAs controlled by the SIM that entered sleep mode (during which time, a hysteresis buffer associated with the SIM in sleep mode may be frozen). In some cases, timing drift and TDD configuration mismatch (e.g., co-existence protection) may be accounted for when operating in fallback modes. In some cases, risk of hardware (e.g., LNA) damage may be reduced by receive/transmit blanking on a SIM (e.g., to prevent damage due to a TDD configuration mismatch). In some cases, no TDD configuration mismatch detection or override may be implemented in DSDA operation, and a maximum transmit power limit (MTPL) backoff may be tentative. In some case, a SIM may reduce an ADC set point based on a frequency offset with respect to the stronger SIM (e.g., due to inability to detect saturation post BBF), and set point control may be set based on an ADC bias parameter that is set for the UE.

Thus, in accordance with various aspects discussed herein, a UE may enter a fallback mode based on a received signal imbalance condition between SIMs. In some cases, the imbalance condition may be based on a configured maximum RSSI delta as the difference between maximum RSSI among RF paths for each SIM. If the maximum RSSI delta is greater than a configurable low or first threshold value (e.g., 10 dB), a condition 1 flag may be set. If the maximum RSSI delta is greater than a configurable high or second threshold value (e.g., 20 dB) a condition 2 flag may be set. Based on the imbalance condition, the UE may enter a fallback procedure. In some cases, the fallback procedure may be entered based on a sliding window hysteresis conditioned on the flag inputs. A FIFO buffer may be defined, that accumulates condition 1 and condition 2 met instances over a window length, and if the enter condition 1 is met for l times during a duration of m slots, the UE may enter the fallback mode 1. If the enter condition 2 is met for l times during a duration of m slots, the UE may enter the fallback mode 2 (e.g., l=8 and m=16).

In some cases, to exit the fallback mode (e.g., return to the default mode), the UE may detect a balanced condition. For example, the UE may use measure differences in RF paths (e.g., may use Rx0/Rx1 RSSI measurements to estimate imbalance on Rx2/Rx3 and vice versa). If the maximum RSSI delta is less than a configurable value (e.g., 6 dB), the UE may set an exit condition. In some cases, the exit fallback procedure may use a sliding window hysteresis on the exit condition. For example, a FIFO buffer may be defined and accumulate exit condition met instances over a window length. If the exit condition met for n times during a duration of m slots, the UE may exit the fallback mode (e.g., switch back to shared iLNA with all RF paths, such as buy using n=16 and m=32).

Figure 7:
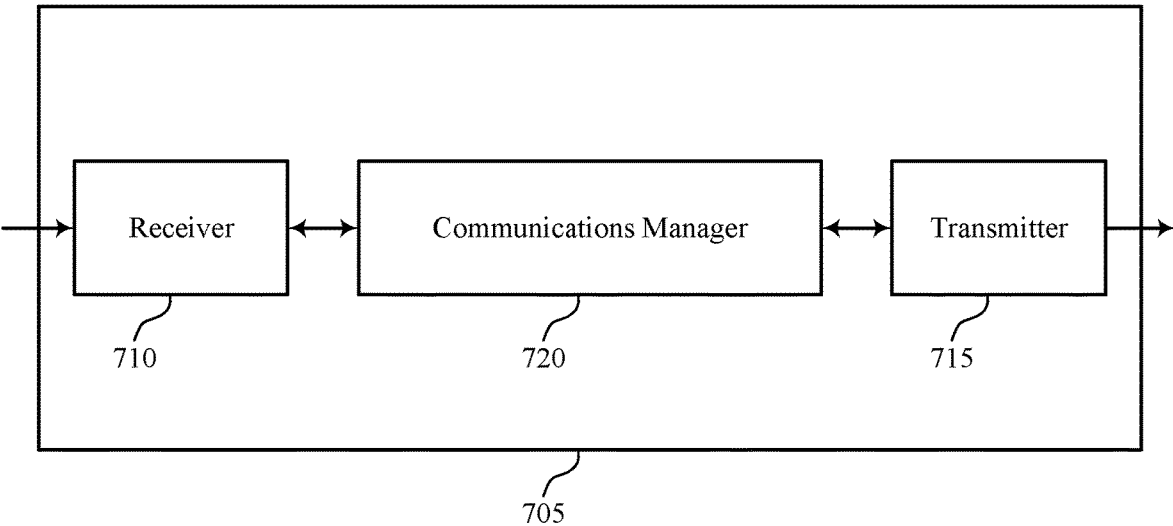
FIGS. 7 and 8 illustrate block diagrams of devices that support techniques to configure LNA for DSDA user equipment in accordance with one or more aspects of the present disclosure.

FIG. 7 illustrates a block diagram 700 of a device 705 that supports techniques to configure LNA for DSDA user equipment in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques to configure LNA for DSDA user equipment). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques to configure LNA for DSDA user equipment). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques to configure LNA for DSDA user equipment as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for establishing a first communications link via two or more antenna ports using a first SIM of the UE in a DSDA mode. The communications manager 720 may be configured as or otherwise support a means for establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The communications manager 720 may be configured as or otherwise support a means for identifying a LNA configuration from two or more available LNA configurations for receiving each of the first communications and the second communications based on activation of the DSDA mode, the identifying based on a difference between a first received signal strength associated with the first communications and a second received signal strength associated with the second communications. The communications manager 720 may be configured as or otherwise support a means for receiving the first communications and the second communications via the two or more antenna ports based on the identified LNA configuration.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for LNA configuration in DSDA operations in which different SIMs have different received signal strengths. Such techniques may provide for efficient communications at the UE based on signal strength differences of the SIMs, which may allow for a UE to set gain control for different SIMs based on current conditions at each SIM. Such techniques may thus enhance UE efficiency, increase data rates, enhance reliability at each SIM, and provide for enhanced user experience.

Figure 8:
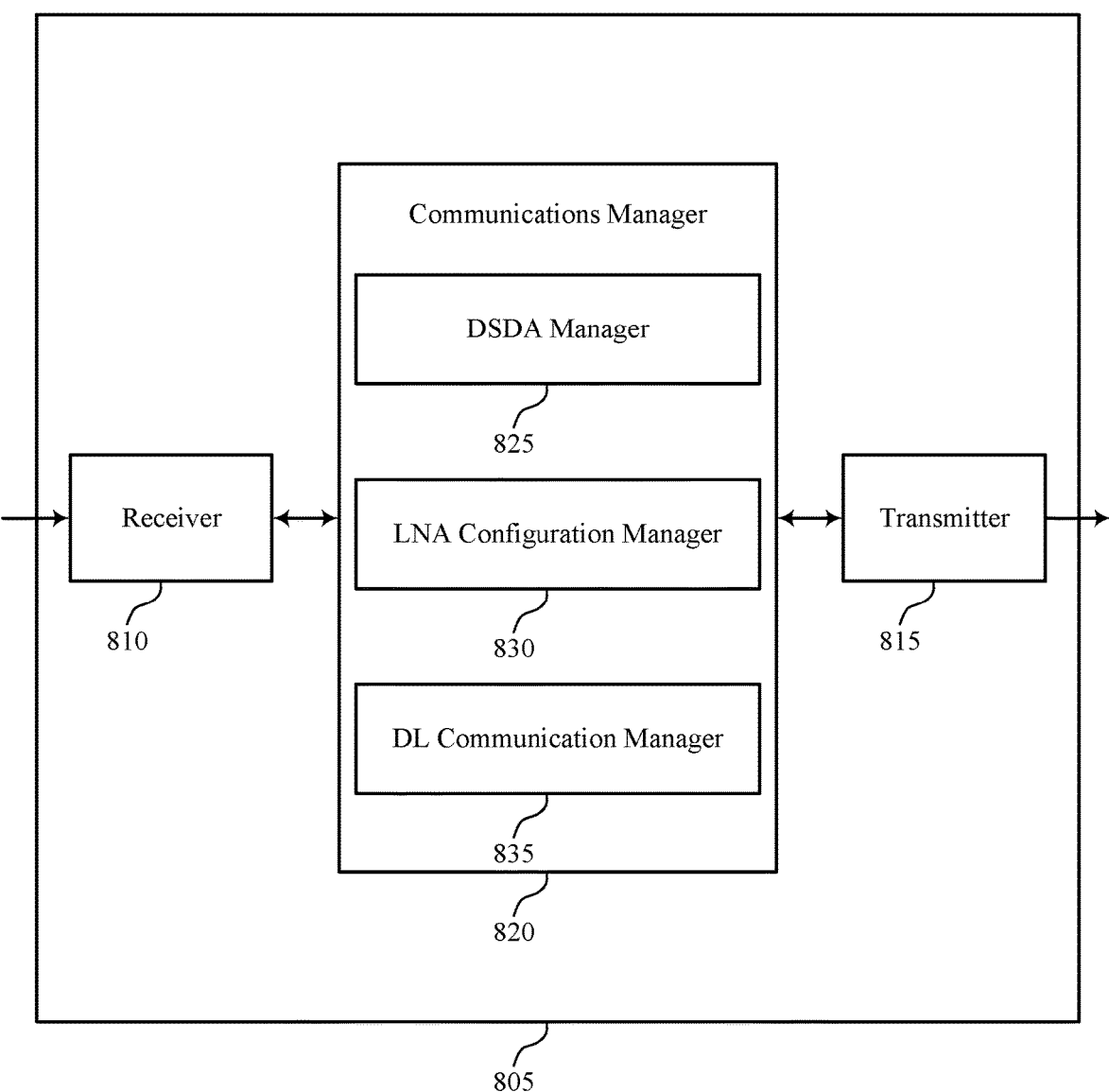

FIG. 8 illustrates a block diagram 800 of a device 805 that supports techniques to configure LNA for DSDA user equipment in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques to configure LNA for DSDA user equipment). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques to configure LNA for DSDA user equipment). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques to configure LNA for DSDA user equipment as described herein. For example, the communications manager 820 may include a DSDA manager 825, an LNA configuration manager 830, a DL communication manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The DSDA manager 825 may be configured as or otherwise support a means for establishing a first communications link via two or more antenna ports using a first SIM of the UE in a DSDA mode. The DSDA manager 825 may be configured as or otherwise support a means for establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The LNA configuration manager 830 may be configured as or otherwise support a means for identifying a LNA configuration from two or more available LNA configurations for receiving each of the first communications and the second communications based on activation of the DSDA mode, the identifying based on a difference between a first received signal strength associated with the first communications and a second received signal strength associated with the second communications. The DL communication manager 835 may be configured as or otherwise support a means for receiving the first communications and the second communications via the two or more antenna ports based on the identified LNA configuration.

Figure 9:
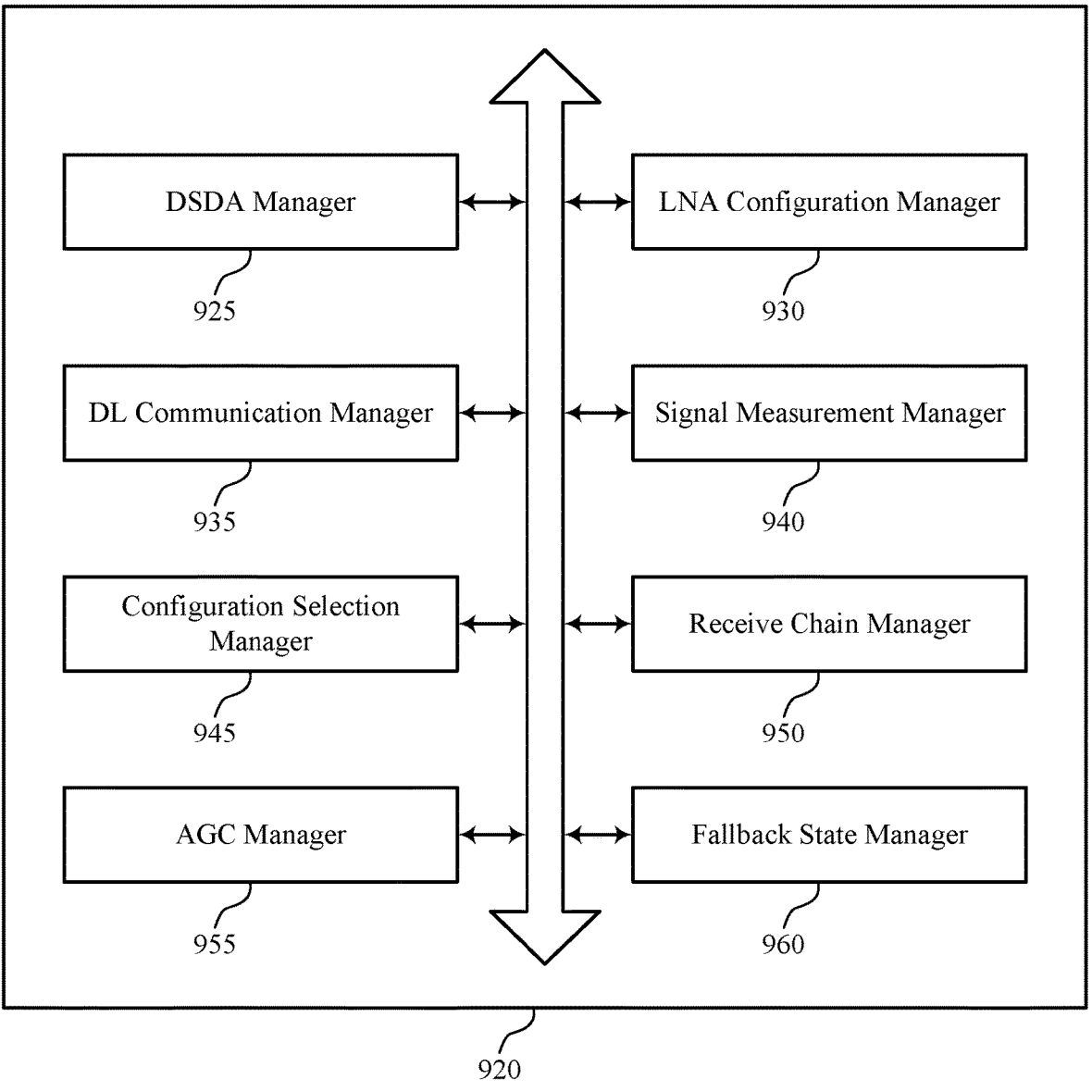
FIG. 9 illustrates a block diagram of a communications manager that supports techniques to configure LNA for DSDA user equipment in accordance with one or more aspects of the present disclosure.

FIG. 9 illustrates a block diagram 900 of a communications manager 920 that supports techniques to configure LNA for DSDA user equipment in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques to configure LNA for DSDA user equipment as described herein. For example, the communications manager 920 may include a DSDA manager 925, an LNA configuration manager 930, a DL communication manager 935, a signal measurement manager 940, a configuration selection manager 945, a receive chain manager 950, an AGC manager 955, a fallback state manager 960, or any combination thereof. Each of these components may communicate, directly or indirectly, with one another (e.g., via one or more buses).

The communications manager 920 may support wireless communication at a UE in accordance with examples as disclosed herein. The DSDA manager 925 may be configured as or otherwise support a means for establishing a first communications link via two or more antenna ports using a first SIM of the UE in a DSDA mode. In some examples, the DSDA manager 925 may be configured as or otherwise support a means for establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The LNA configuration manager 930 may be configured as or otherwise support a means for identifying a LNA configuration from two or more available LNA configurations for receiving each of the first communications and the second communications based on activation of the DSDA mode, the identifying based on a difference between a first received signal strength associated with the first communications and a second received signal strength associated with the second communications. The DL communication manager 935 may be configured as or otherwise support a means for receiving the first communications and the second communications via the two or more antenna ports based on the identified LNA configuration.

In some examples, to support identifying the LNA configuration, the signal measurement manager 940 may be configured as or otherwise support a means for measuring the first received signal strength associated with the first communications and the second received signal strength associated with the second communications to determine a difference between the first received signal strength and the second received signal strength. In some examples, to support identifying the LNA configuration, the configuration selection manager 945 may be configured as or otherwise support a means for selecting, responsive to the difference between the first received signal strength and the second received signal strength being less than or equal to a first threshold value, a first LNA configuration in which each of the first SIM and the second SIM use each of a set of multiple LNAs associated with a set of antenna ports that receive both the first communications and the second communications. In some examples, to support identifying the LNA configuration, the configuration selection manager 945 may be configured as or otherwise support a means for selecting, responsive to the difference between the first received signal strength and the second received signal strength exceeding the first threshold value, a second LNA configuration in which the first SIM controls a first subset of LNAs associated with a first subset of the set of antenna ports, and the second SIM controls a second subset of LNAs associated with a second subset of the set of antenna ports.

In some examples, the first subset of LNAs and the second subset of LNAs are determined based on a magnitude of the difference between the first received signal strength and the second received signal strength. In some examples, the first SIM controls a gain of each of the set of multiple LNAs in the first LNA configuration. In some examples, the first SIM controls a gain of each of the first subset of LNAs, and the second SIM controls the gain of each of the second subset of LNAs, in the second LNA configuration.

In some examples, the first SIM uses signals from each antenna port of the first subset of antenna ports and the second subset of antenna ports for receiving the first communications when the second LNA configuration is selected. In some examples, the first SIM does not use any of the antenna ports of the second subset of antenna ports for receiving the first communications when the second LNA configuration is selected.

In some examples, the first SIM does not use any of the antenna ports of the second subset of antenna ports for receiving the first communications when the second LNA configuration is selected, and the second SIM does not use any of the antenna ports of the first subset of antenna ports for receiving the second communications when the second LNA configuration is selected. In some examples, the identified LNA configuration provides for control of a set of multiple LNAs at the UE, the set of multiple LNAs include two or more internal LNAs that are internal to a wireless modem of the UE and two or more external LNAs that are external to the wireless modem of the UE.

In some examples, radio frequency signals from each of the two or more external LNAs are split and provided to respective first internal LNAs associated with the first SIM and second internal LNAs associated with the second SIM. In some examples, radio frequency signals from each of the two or more external LNAs are provided to an associated internal LNA, and an output from each of the two or more internal LNAs are split and provided to separate processing chains associated with the first SIM and the second SIM. In some examples, the first SIM controls an automatic gain control for at least a first subset of the set of multiple LNAs, and the second SIM controls the automatic gain control for at least a second subset of the set of multiple LNAs, and where a timing for updating the automatic gain control is based on which of the first SIM or the second SIM controls the associated LNA.

In some examples, to support identifying the LNA configuration, the signal measurement manager 940 may be configured as or otherwise support a means for determining that the difference between a first received signal strength associated with the first communications and a second received signal strength associated with the second communications exceeds a threshold value. In some examples, to support identifying the LNA configuration, the AGC manager 955 may be configured as or otherwise support a means for selecting, responsive to the determining, a LNA configuration in which the first SIM controls at least one of the two or more internal LNAs and at least one of the two or more external LNAs, and in which the second SIM controls at least one of the two or more internal LNAs. In some examples, the threshold value is based on a gain control or dynamic tuning range of the two or more internal LNAs.

In some examples, the DL communication manager 935 may be configured as or otherwise support a means for determining that the first SIM has a higher priority than the second SIM. In some examples, the receive chain manager 950 may be configured as or otherwise support a means for mapping a first subset of the two or more antenna ports to the first SIM based on the higher priority of the first SIM, and where the LNA configuration is based on the mapping.

In some examples, to support receiving, the DL communication manager 935 may be configured as or otherwise support a means for setting one or more analog-to-digital converter (ADC) parameters for the first communications based on a frequency offset between the first communications and the second communications when the first communications have a stronger signal strength than the second communications.

In some examples, the identifying includes identifying a first LNA configuration based on the difference between the first received signal strength and the second received signal strength being less than or equal to a first threshold value. In some examples, the signal measurement manager 940 may be configured as or otherwise support a means for determining, subsequent to identifying the first LNA configuration, that the difference between the first received signal strength and the second received signal strength exceeds the first threshold value. In some examples, the identifying includes identifying a first LNA configuration based on the difference between the first received signal strength and the second received signal strength being less than or equal to a first threshold value, the first LNA configuration providing that each SIM uses each antenna port. In some examples, the selection manager 945 may be configured as or otherwise support a means for selecting a second LNA configuration responsive to the determining, where the second LNA configuration provides that the first SIM controls a first subset of LNAs associated with a first subset of the two or more antenna ports, and the second SIM controls a second subset of LNAs associated with a second subset of the two or more antenna ports.

In some examples, the identifying includes identifying a first LNA configuration based on the difference between the first received signal strength and the second received signal strength being less than or equal to a first threshold value, the first LNA configuration providing that each SIM uses each antenna port. In some examples, the receive chain manager 950 may be configured as or otherwise support a means for receiving the first communications via the first subset of antenna ports using the first subset of LNAs. In some examples, the identifying includes identifying a first LNA configuration based on the difference between the first received signal strength and the second received signal strength being less than or equal to a first threshold value, the first LNA configuration providing that each SIM uses each antenna port. In some examples, the receive chain manager 950 may be configured as or otherwise support a means for receiving the second communications via the second subset of antenna ports using the second subset of LNAs.

In some examples, the difference between the first received signal strength and the second received signal strength is determined based on filtered received signal strength indicators (RSSIs) in a sliding window, the filtered RSSIs associated with the first communications and the second communications. In some examples, to support determining, the signal measurement manager 940 may be configured as or otherwise support a means for determining that the difference between the first received signal strength and the second received signal strength exceeds the first threshold value on a predetermined number of occasions within a predetermined time period.

In some examples, the signal measurement manager 940 may be configured as or otherwise support a means for determining, subsequent to the selection of the second LNA configuration, that the difference between the first received signal strength and the second received signal strength is less than or equal to a second threshold value. In some examples, the configuration selection manager 945 may be configured as or otherwise support a means for selecting the first LNA configuration responsive to the determining that the difference between the first received signal strength and the second received signal strength is less than or equal to a second threshold value. In some examples, the DL communication manager 935 may be configured as or otherwise support a means for receiving the first communications and the second communications via the two or more antenna ports based on the first LNA configuration. In some examples, the second threshold value is less than the first threshold.

In some examples, the first SIM controls a set of multiple LNAs in the first LNA configuration during periods in which the first SIM is not in a sleep mode, and the second SIM controls the set of multiple LNAs in the first LNA configuration during periods in which the first SIM is in the sleep mode. In some examples, the first SIM suspends communications during one or more slots based on a timing drift associated with the first communications or a TDD configuration mismatch between the first communications and the second communications.

In some examples, a first LNA configuration of the two or more available LNA configurations is identified for receiving the first communications and the second communications based on the difference between the first received signal strength and the second received signal strength being less than or equal to a first threshold value, the first LNA configuration providing that each SIM uses each antenna port and associated LNAs for receiving the respective first and second communications. In some examples, gain control for each of the associated LNAs is controlled by the first SIM when the first received signal strength exceeds the second received signal strength.

In some examples, to support identifying, the fallback state manager 960 may be configured as or otherwise support a means for identifying a first LNA configuration responsive to the UE being in a first state in which the difference between the first received signal strength and the second received signal strength is less than or equal to a first threshold value and each SIM uses each of the two or more antenna ports for the concurrent communications. In some examples, to support identifying, the fallback state manager 960 may be configured as or otherwise support a means for identifying a second LNA configuration responsive to the UE being in a second state in which the difference between the first received signal strength and the second received signal strength exceeds the first threshold value, the second LNA configuration providing that one of the first SIM or the second SIM that has a lower service priority provides gain control for a first subset of the two or more antenna ports that have relatively larger differences in received signal strength and the other of the first SIM or the second SIM provides gain control for other antenna ports outside of the first subset of the two or more antenna ports. In some examples, to support identifying, the fallback state manager 960 may be configured as or otherwise support a means for identifying a third LNA configuration responsive to the UE being in a third state in which the difference between the first received signal strength and the second received signal strength exceeds a second threshold value that is greater than the first threshold value, the third LNA configuration providing that one of the first SIM or the second SIM that has a higher service priority uses only a first subset of the two or more antenna ports that have relatively smaller differences in received signal strength and the other of the first SIM or the second SIM uses only one or more other antenna ports outside of the first subset of the two or more antenna ports.

Figure 10:
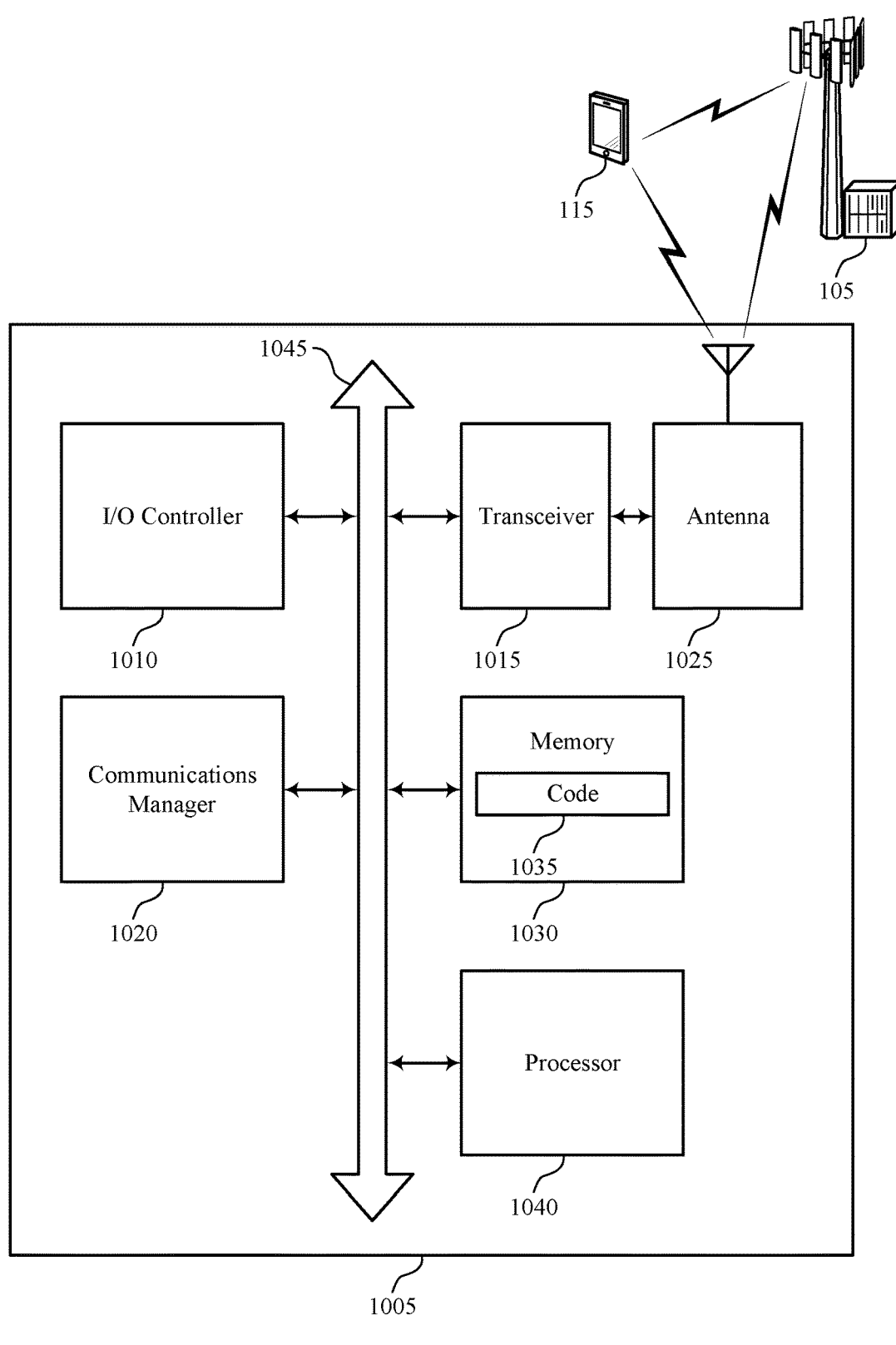
FIG. 10 illustrates a diagram of a system including a device that supports techniques to configure LNA for DSDA user equipment in accordance with one or more aspects of the present disclosure.

FIG. 10 illustrates a diagram of a system 1000 including a device 1005 that supports techniques to configure LNA for DSDA user equipment in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques to configure LNA for DSDA user equipment). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for establishing a first communications link via two or more antenna ports using a first SIM of the UE in a DSDA mode. The communications manager 1020 may be configured as or otherwise support a means for establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The communications manager 1020 may be configured as or otherwise support a means for identifying a LNA configuration from two or more available LNA configurations for receiving each of the first communications and the second communications based on activation of the DSDA mode, the identifying based on a difference between a first received signal strength associated with the first communications and a second received signal strength associated with the second communications. The communications manager 1020 may be configured as or otherwise support a means for receiving the first communications and the second communications via the two or more antenna ports based on the identified LNA configuration.

By including or configuring the communications manager 1020 in accordance with examples as described herein, the device 1005 may support techniques for LNA configuration in DSDA operations in which different SIMs have different received signal strengths. Such techniques may provide for efficient communications at the UE based on signal strength differences of the SIMS, which may allow for a UE to set gain control for different SIMs based on current conditions at each SIM. Such techniques may thus enhance UE efficiency, increase data rates, enhance reliability at each SIM, and provide for enhanced user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques to configure LNA for DSDA user equipment as described herein, or the processor 1040 and the memory 1030 may be otherwise configured to perform or support such operations.

FIG. 11 illustrates a flowchart illustrating a method 1100 that supports techniques to configure LNA for DSDA user equipment in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include establishing a first communications link via two or more antenna ports using a first SIM of the UE in a DSDA mode. The operations of 1105 may be performed in accordance with examples as disclosed herein. In some examples, aspects of the operations of 1105 may be performed by a DSDA manager 925 as described with reference to FIG. 9.

At 1110, the method may include establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The operations of 1110 may be performed in accordance with examples as disclosed herein. In some examples, aspects of the operations of 1110 may be performed by a DSDA manager 925 as described with reference to FIG. 9.

At 1115, the method may include identifying a LNA configuration from two or more available LNA configurations for receiving each of the first communications and the second communications based on activation of the DSDA mode, the identifying based on a difference between a first received signal strength associated with the first communications and a second received signal strength associated with the second communications. The operations of 1115 may be performed in accordance with examples as disclosed herein. In some examples, aspects of the operations of 1115 may be performed by an LNA configuration manager 930 as described with reference to FIG. 9.

At 1120, the method may include receiving the first communications and the second communications via the two or more antenna ports based on the identified LNA configuration. The operations of 1120 may be performed in accordance with examples as disclosed herein. In some examples, aspects of the operations of 1120 may be performed by a DL communication manager 935 as described with reference to FIG. 9.

FIG. 12 illustrates a flowchart illustrating a method 1200 that supports techniques to configure LNA for DSDA user equipment in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include establishing a first communications link via two or more antenna ports using a first SIM of the UE in a DSDA mode. The operations of 1205 may be performed in accordance with examples as disclosed herein. In some examples, aspects of the operations of 1205 may be performed by a DSDA manager 925 as described with reference to FIG. 9.

At 1210, the method may include establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The operations of 1210 may be performed in accordance with examples as disclosed herein. In some examples, aspects of the operations of 1210 may be performed by a DSDA manager 925 as described with reference to FIG. 9.

At 1215, the method may include measuring a first received signal strength associated with the first communications and a second received signal strength associated with the second communications to determine a difference between the first received signal strength and the second received signal strength. The operations of 1215 may be performed in accordance with examples as disclosed herein.

In some examples, aspects of the operations of 1215 may be performed by a signal measurement manager 940 as described with reference to FIG. 9.

At 1220, the method may include selecting, responsive to the difference between the first received signal strength and the second received signal strength being less than or equal to a first threshold value, a first LNA configuration in which each of the first SIM and the second SIM use each of a plurality of multiple LNAs associated with a set of antenna ports that receive both the first communications and the second communications. The operations of 1220 may be performed in accordance with examples as disclosed herein. In some examples, aspects of the operations of 1220 may be performed by a configuration selection manager 945 as described with reference to FIG. 9.

At 1225, the method may include selecting, responsive to the difference between the first received signal strength and the second received signal strength exceeding the first threshold value, a second LNA configuration in which the first SIM controls a first subset of LNAs associated with a first subset of the set of antenna ports, and the second SIM controls a second subset of LNAs associated with a second subset of the set of antenna ports. The operations of 1225 may be performed in accordance with examples as disclosed herein. In some examples, aspects of the operations of 1225 may be performed by a configuration selection manager 945 as described with reference to FIG. 9.

At 1230, the method may include receiving the first communications and the second communications via the two or more antenna ports based on the selected LNA configuration. The operations of 1230 may be performed in accordance with examples as disclosed herein. In some examples, aspects of the operations of 1230 may be performed by a DL communication manager 935 as described with reference to FIG. 9.

FIG. 13 illustrates a flowchart illustrating a method 1300 that supports techniques to configure LNA for DSDA user equipment in accordance with one or more aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include establishing a first communications link via two or more antenna ports using a first SIM of the UE in a DSDA mode. The operations of 1305 may be performed in accordance with examples as disclosed herein. In some examples, aspects of the operations of 1305 may be performed by a DSDA manager 925 as described with reference to FIG. 9.

At 1310, the method may include establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The operations of 1310 may be performed in accordance with examples as disclosed herein. In some examples, aspects of the operations of 1310 may be performed by a DSDA manager 925 as described with reference to FIG. 9.

At 1315, the method may include determining that the difference between a first received signal strength associated with the first communications and a second received signal strength associated with the second communications exceeds a threshold value. The operations of 1315 may be performed in accordance with examples as disclosed herein. In some examples, aspects of the operations of 1315 may be performed by a signal measurement manager 940 as described with reference to FIG. 9.

At 1320, the method may include selecting, responsive to the determining, a LNA configuration in which the first SIM controls at least one of the two or more internal LNAs and at least one of the two or more external LNAs, and in which the second SIM controls at least one of the two or more internal LNAs. The operations of 1320 may be performed in accordance with examples as disclosed herein. In some examples, aspects of the operations of 1320 may be performed by an AGC manager 955 as described with reference to FIG. 9. In some cases, the LNA configuration provides for control of a set of multiple LNAs at the UE, the set of multiple LNAs include two or more internal LNAs that are internal to a wireless modem of the UE and two or more external LNAs that are external to the wireless modem of the UE.

At 1325, the method may include receiving the first communications and the second communications via the two or more antenna ports based on the identified LNA configuration. The operations of 1325 may be performed in accordance with examples as disclosed herein. In some examples, aspects of the operations of 1325 may be performed by a DL communication manager 935 as described with reference to FIG. 9.

FIG. 14 illustrates a flowchart illustrating a method 1400 that supports techniques to configure LNA for DSDA user equipment in accordance with one or more aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include establishing a first communications link via two or more antenna ports using a first SIM of the UE in a DSDA mode. The operations of 1405 may be performed in accordance with examples as disclosed herein. In some examples, aspects of the operations of 1405 may be performed by a DSDA manager 925 as described with reference to FIG. 9.

At 1410, the method may include establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The operations of 1410 may be performed in accordance with examples as disclosed herein. In some examples, aspects of the operations of 1410 may be performed by a DSDA manager 925 as described with reference to FIG. 9.

At 1415, the method may include identifying a LNA configuration from two or more available LNA configurations for receiving each of the first communications and the second communications based on activation of the DSDA mode, the identifying based on a difference between a first received signal strength associated with the first communications and a second received signal strength associated with the second communications. The operations of 1415 may be performed in accordance with examples as disclosed herein. In some examples, aspects of the operations of 1415 may be performed by an LNA configuration manager 930 as described with reference to FIG. 9.

At 1420, the method may include determining that the first SIM has a higher priority than the second SIM. The operations of 1420 may be performed in accordance with examples as disclosed herein. In some examples, aspects of the operations of 1420 may be performed by a DL communication manager 935 as described with reference to FIG. 9.

At 1425, the method may include mapping a first subset of the two or more antenna ports to the first SIM based on the higher priority of the first SIM, and where the LNA configuration is based on the mapping. The operations of 1425 may be performed in accordance with examples as disclosed herein. In some examples, aspects of the operations of 1425 may be performed by a receive chain manager 950 as described with reference to FIG. 9.

At 1430, the method may include receiving the first communications and the second communications via the two or more antenna ports based on the identified LNA configuration. The operations of 1430 may be performed in accordance with examples as disclosed herein. In some examples, aspects of the operations of 1430 may be performed by a DL communication manager 935 as described with reference to FIG. 9.

FIG. 15 illustrates a flowchart illustrating a method 1500 that supports techniques to configure LNA for DSDA user equipment in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include establishing a first communications link via two or more antenna ports using a first SIM of the UE in a DSDA mode. The operations of 1505 may be performed in accordance with examples as disclosed herein. In some examples, aspects of the operations of 1505 may be performed by a DSDA manager 925 as described with reference to FIG. 9.

At 1510, the method may include establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The operations of 1510 may be performed in accordance with examples as disclosed herein. In some examples, aspects of the operations of 1510 may be performed by a DSDA manager 925 as described with reference to FIG. 9.

At 1515, the method may include identifying a LNA configuration from two or more available LNA configurations for receiving each of the first communications and the second communications based on activation of the DSDA mode, the identifying based on a difference between a first received signal strength associated with the first communications and a second received signal strength associated with the second communications. The operations of 1515 may be performed in accordance with examples as disclosed herein. In some examples, aspects of the operations of 1515 may be performed by an LNA configuration manager 930 as described with reference to FIG. 9.

At 1520, the method may include setting one or more analog-to-digital converter (ADC) parameters for the first communications based on a frequency offset between the first communications and the second communications when the first communications have a stronger signal strength than the second communications. The operations of 1520 may be performed in accordance with examples as disclosed herein. In some examples, aspects of the operations of 1520 may be performed by a DL communication manager 935 as described with reference to FIG. 9.

At 1525, the method may include receiving the first communications and the second communications via the two or more antenna ports based on the identified LNA configuration. The operations of 1525 may be performed in accordance with examples as disclosed herein. In some examples, aspects of the operations of 1525 may be performed by a DL communication manager 935 as described with reference to FIG. 9.

FIG. 16 illustrates a flowchart illustrating a method 1600 that supports techniques to configure LNA for DSDA user equipment in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include establishing a first communications link via two or more antenna ports using a first SIM of the UE in a DSDA mode. The operations of 1605 may be performed in accordance with examples as disclosed herein. In some examples, aspects of the operations of 1605 may be performed by a DSDA manager 925 as described with reference to FIG. 9.

At 1610, the method may include establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The operations of 1610 may be performed in accordance with examples as disclosed herein. In some examples, aspects of the operations of 1610 may be performed by a DSDA manager 925 as described with reference to FIG. 9.

At 1615, the method may include identifying a first LNA configuration from two or more available LNA configurations for receiving each of the first communications and the second communications based on activation of the DSDA mode, the identifying based on a difference between a first received signal strength associated with the first communications and a second received signal strength associated with the second communications. The operations of 1615 may be performed in accordance with examples as disclosed herein. In some examples, aspects of the operations of 1615 may be performed by an LNA configuration manager 930 as described with reference to FIG. 9.

At 1620, the method may include determining, subsequent to identifying the first LNA configuration, that the difference between the first received signal strength and the second received signal strength exceeds the first threshold value. The operations of 1620 may be performed in accordance with examples as disclosed herein. In some examples, aspects of the operations of 1620 may be performed by a signal measurement manager 940 as described with reference to FIG. 9.

At 1625, the method may include selecting a second LNA configuration responsive to the determining, where the second LNA configuration provides that the first SIM controls a first subset of LNAs associated with a first subset of the two or more antenna ports, and the second SIM controls a second subset of LNAs associated with a second subset of the two or more antenna ports. The operations of 1625 may be performed in accordance with examples as disclosed herein. In some examples, aspects of the operations of 1625 may be performed by a configuration selection manager 945 as described with reference to FIG. 9.

At 1630, the method may include receiving the first communications via the first subset of antenna ports using the first subset of LNAs. The operations of 1630 may be performed in accordance with examples as disclosed herein. In some examples, aspects of the operations of 1630 may be performed by a receive chain manager 950 as described with reference to FIG. 9.

At 1635, the method may include receiving the second communications via the second subset of antenna ports using the second subset of LNAs. The operations of 1635 may be performed in accordance with examples as disclosed herein. In some examples, aspects of the operations of 1635 may be performed by a receive chain manager 950 as described with reference to FIG. 9.

FIG. 17 illustrates a flowchart illustrating a method 1700 that supports techniques to configure LNA for DSDA user equipment in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include establishing a first communications link via two or more antenna ports using a first SIM of the UE in a DSDA mode. The operations of 1705 may be performed in accordance with examples as disclosed herein. In some examples, aspects of the operations of 1705 may be performed by a DSDA manager 925 as described with reference to FIG. 9.

At 1710, the method may include establishing a second communications link via the two or more antenna ports using a second SIM of the UE in the DSDA mode, the DSDA mode for receiving concurrent communications for at least the first SIM and the second SIM via the two or more antenna ports of the UE, the concurrent communications including first communications using the first SIM and second communications using the second SIM. The operations of 1710 may be performed in accordance with examples as disclosed herein. In some examples, aspects of the operations of 1710 may be performed by a DSDA manager 925 as described with reference to FIG. 9.

At 1715, the method may include identifying a first LNA configuration responsive to the UE being in a first state in which the difference between the first received signal strength and the second received signal strength is less than or equal to a first threshold value and each SIM uses each of the two or more antenna ports for the concurrent communications. The operations of 1715 may be performed in accordance with examples as disclosed herein. In some examples, aspects of the operations of 1715 may be performed by a fallback state manager 960 as described with reference to FIG. 9.

At 1720, the method may include identifying a second LNA configuration responsive to the UE being in a second state in which the difference between the first received signal strength and the second received signal strength exceeds the first threshold value, the second LNA configuration providing that one of the first SIM or the second SIM that has a lower service priority provides AGC for a first subset of the two or more antenna ports that have relatively larger differences in received signal strength and the other of the first SIM or the second SIM provides AGC for other antenna ports outside of the first subset of the two or more antenna ports. The operations of 1720 may be performed in accordance with examples as disclosed herein. In some examples, aspects of the operations of 1720 may be performed by a fallback state manager 960 as described with reference to FIG. 9.

At 1725, the method may include identifying a third LNA configuration responsive to the UE being in a third state in which the difference between the first received signal strength and the second received signal strength exceeds a second threshold value that is greater than the first threshold value, the third LNA configuration providing that one of the first SIM or the second SIM that has a higher service priority uses only a first subset of the two or more antenna ports that have relatively smaller differences in received signal strength and the other of the first SIM or the second SIM uses only one or more other antenna ports outside of the first subset of the two or more antenna ports. The operations of 1725 may be performed in accordance with examples as disclosed herein. In some examples, aspects of the operations of 1725 may be performed by a fallback state manager 960 as described with reference to FIG. 9.

At 1730, the method may include receiving the first communications and the second communications via the two or more antenna ports based on the identified LNA configuration. The operations of 1730 may be performed in accordance with examples as disclosed herein. In some examples, aspects of the operations of 1730 may be performed by a DL communication manager 935 as described with reference to FIG. 9. The following provides an overview of aspects of the present disclosure:

Aspect 1: A method for wireless communication at a UE, comprising: establishing a first communications link via two or more antenna ports using a first SIM of the UE in a dual-subscriber dual-active mode; establishing a second communications link via the two or more antenna ports using a second SIM of the UE in the dual-subscriber dual-active mode, the dual-subscriber dual-active mode for receiving concurrent communications for at least the first SIM and the second SIM via the two or more antenna ports of the UE, the concurrent communications including first communications using the first SIM and second communications using the second SIM; identifying a low noise amplifier configuration from two or more available low noise amplifier configurations for receiving each of the first communications and the second communications based at least in part on activation of the dual-subscriber dual-active mode, the identifying based at least in part on a difference between a first received signal strength associated with the first communications and a second received signal strength associated with the second communications; and receiving the first communications and the second communications via the two or more antenna ports based at least in part on the identified low noise amplifier configuration.

Aspect 2: The method of aspect 1, wherein the identifying the low noise amplifier configuration comprises: measuring the first received signal strength associated with the first communications and the second received signal strength associated with the second communications to determine a difference between the first received signal strength and the second received signal strength; selecting, responsive to the difference between the first received signal strength and the second received signal strength being less than or equal to a first threshold value, a first low noise amplifier configuration in which each of the first SIM and the second SIM use each of a plurality of low noise amplifiers associated with a set of antenna ports that receive both the first communications and the second communications; and selecting, responsive to the difference between the first received signal strength and the second received signal strength exceeding the first threshold value, a second low noise amplifier configuration in which the first SIM controls a first subset of low noise amplifiers associated with a first subset of the set of antenna ports, and the second SIM controls a second subset of low noise amplifiers associated with a second subset of the set of antenna ports.

Aspect 3: The method of aspect 2, wherein the first subset of low noise amplifiers and the second subset of low noise amplifiers are determined based at least in part on a magnitude of the difference between the first received signal strength and the second received signal strength.

Aspect 4: The method of any of aspects 2 through 3, wherein the first SIM controls a gain of each of the plurality of low noise amplifiers in the first low noise amplifier configuration.

Aspect 5: The method of any of aspects 2 through 4, wherein the first SIM controls a gain of each of the first subset of low noise amplifiers, and the second SIM controls the gain of each of the second subset of low noise amplifiers, in the second low noise amplifier configuration.

Aspect 6: The method of any of aspects 2 through 5, wherein the first SIM uses signals from each antenna port of the first subset of antenna ports and the second subset of antenna ports for receiving the first communications when the second low noise amplifier configuration is selected.

Aspect 7: The method of any of aspects 2 through 5, wherein the first SIM does not use any of the antenna ports of the second subset of antenna ports for receiving the first communications when the second low noise amplifier configuration is selected.

Aspect 8: The method of any of aspects 2 through 4, wherein the first SIM does not use any of the antenna ports of the second subset of antenna ports for receiving the first communications when the second low noise amplifier configuration is selected, and the second SIM does not use any of the antenna ports of the first subset of antenna ports for receiving the second communications when the second low noise amplifier configuration is selected.

Aspect 9: The method of any of aspects 1 through 8, wherein the identified low noise amplifier configuration provides for control of a plurality of low noise amplifiers at the UE, the plurality of low noise amplifiers include two or more internal low noise amplifiers that are internal to a wireless modem of the UE and two or more external low noise amplifiers that are external to the wireless modem of the UE, and wherein the first communications link and the second communications link each comprise one or more component carriers.

Aspect 10: The method of aspect 9, wherein radio frequency signals from each of the two or more external low noise amplifiers are split and provided to respective first internal low noise amplifiers associated with the first SIM and second internal low noise amplifiers associated with the second SIM.

Aspect 11: The method of any of aspect 9, wherein radio frequency signals from each of the two or more external low noise amplifiers are provided to an associated internal low noise amplifier, and an output from each of the two or more internal low noise amplifiers are split and provided to separate processing chains associated with the first SIM and the second SIM.

Aspect 12: The method of any of aspects 9 through 11, wherein the first SIM controls an automatic gain control for at least a first subset of the plurality of low noise amplifiers, and the second SIM controls the automatic gain control for at least a second subset of the plurality of low noise amplifiers, and wherein a timing for updating the automatic gain control is based at least in part on which of the first SIM or the second SIM controls the associated low noise amplifier.

Aspect 13: The method of any of aspects 9 through 12, wherein the identifying the low noise amplifier configuration comprises: determining that the difference between a first received signal strength associated with the first communications and a second received signal strength associated with the second communications exceeds a threshold value, and selecting, responsive to the determining, a low noise amplifier configuration in which the first SIM controls at least one of the two or more internal low noise amplifiers and at least one of the two or more external low noise amplifiers, and in which the second SIM controls at least one of the two or more internal low noise amplifiers.

Aspect 14: The method of aspect 13, wherein the threshold value is based at least in part on a gain control or dynamic tuning range of the two or more internal low noise amplifiers.

Aspect 15: The method of any of aspects 1 through 14, further comprising: determining that the first SIM has a higher priority than the second SIM; and mapping a first subset of the two or more antenna ports to the first SIM based at least in part on the higher priority of the first SIM, and wherein the low noise amplifier configuration is based at least in part on the mapping.

Aspect 16: The method of any of aspects 1 through 15, wherein the receiving further comprises: setting one or more analog-to-digital converter (ADC) parameters for the first communications based at least in part on a frequency offset between the first communications and the second communications when the first communications have a stronger signal strength than the second communications.

Aspect 17: The method of any of aspects 1 through 16, wherein the identifying comprises identifying a first low noise amplifier configuration based at least in part on the difference between the first received signal strength and the second received signal strength being less than or equal to a first threshold value, the first low noise amplifier configuration providing that each SIM uses each antenna port and associated low noise amplifiers for receiving the respective first and second communications, and wherein the method further comprises: determining, subsequent to identifying the first low noise amplifier configuration, that the difference between the first received signal strength and the second received signal strength exceeds the first threshold value; selecting a second low noise amplifier configuration responsive to the determining, wherein the second low noise amplifier configuration provides that the first SIM controls a first subset of low noise amplifiers associated with a first subset of the two or more antenna ports, and the second SIM controls a second subset of low noise amplifiers associated with a second subset of the two or more antenna ports; receiving the first communications via the first subset of antenna ports using the first subset of low noise amplifiers; and receiving the second communications via the second subset of antenna ports using the second subset of low noise amplifiers.

Aspect 18: The method of aspect 17, wherein the difference between the first received signal strength and the second received signal strength is determined based at least in part on filtered received signal strength indicators (RSSIs) in a sliding window, the filtered RSSIs associated with the first communications and the second communications.

Aspect 19: The method of any of aspects 17 through 18, wherein the determining comprises: determining that the difference between the first received signal strength and the second received signal strength exceeds the first threshold value on a predetermined number of occasions within a predetermined time period.

Aspect 20: The method of any of aspects 17 through 19, further comprising: determining, subsequent to the selection of the second low noise amplifier configuration, that the difference between the first received signal strength and the second received signal strength is less than or equal to a second threshold value; selecting the first low noise amplifier configuration responsive to the determining that the difference between the first received signal strength and the second received signal strength is less than or equal to a second threshold value; and receiving the first communications and the second communications via the two or more antenna ports based at least in part on the first low noise amplifier configuration.

Aspect 21: The method of aspect 20, wherein the second threshold value is less than the first threshold.

Aspect 22: The method of any of aspects 17 through 21, wherein the first SIM controls a plurality of low noise amplifiers in the first low noise amplifier configuration during periods in which the first SIM is not in a sleep mode, and the second SIM controls the plurality of low noise amplifiers in the first low noise amplifier configuration during periods in which the first SIM is in the sleep mode.

Aspect 23: The method of any of aspects 17 through 22, wherein the first SIM suspends communications during one or more slots based at least in part on a timing drift associated with the first communications or a TDD configuration mismatch between the first communications and the second communications.

Aspect 24: The method of any of aspect 1, wherein a first low noise amplifier configuration of the two or more available low noise amplifier configurations is identified for receiving the first communications and the second communications based at least in part on the difference between the first received signal strength and the second received signal strength being less than or equal to a first threshold value, the first low noise amplifier configuration providing that each SIM uses each antenna port and associated low noise amplifiers for receiving the respective first and second communications, and wherein gain control for each of the associated low noise amplifiers is controlled by the first SIM when the first received signal strength exceeds the second received signal strength.

Aspect 25: The method of any of aspect 1, wherein the identifying comprises: identifying a first low noise amplifier configuration responsive to the UE being in a first state in which the difference between the first received signal strength and the second received signal strength is less than or equal to a first threshold value and each SIM uses each of the two or more antenna ports for the concurrent communications; identifying a second low noise amplifier configuration responsive to the UE being in a second state in which the difference between the first received signal strength and the second received signal strength exceeds the first threshold value, the second low noise amplifier configuration providing that one of the first SIM or the second SIM that has a lower service priority provides gain control for a first subset of the two or more antenna ports that have relatively larger differences in received signal strength and the other of the first SIM or the second SIM provides gain control for other antenna ports outside of the first subset of the two or more antenna ports; and identifying a third low noise amplifier configuration responsive to the UE being in a third state in which the difference between the first received signal strength and the second received signal strength exceeds a second threshold value that is greater than the first threshold value, the third low noise amplifier configuration providing that one of the first SIM or the second SIM that has a higher service priority uses only a first subset of the two or more antenna ports that have relatively smaller differences in received signal strength and the other of the first SIM or the second SIM uses only one or more other antenna ports outside of the first subset of the two or more antenna ports.

Aspect 26: An apparatus for wireless communication at a UE, comprising a processor; memory coupled with the processor; and instructions stored in the memory and executable by the processor to cause the apparatus to perform a method of any of aspects 1 through 25.

Aspect 27: An apparatus for wireless communication at a UE, comprising at least one means for performing a method of any of aspects 1 through 25.

Aspect 28: A non-transitory computer-readable medium storing code for wireless communication at a UE, the code comprising instructions executable by a processor to perform a method of any of aspects 1 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

establishing a first communications link via two or more antenna ports using a first subscriber identity module (SIM) of the UE in a dual-subscriber dual-active mode;

establishing a second communications link via the two or more antenna ports using a second SIM of the UE in the dual-subscriber dual-active mode, the dual-subscriber dual-active mode for receiving concurrent communications for at least the first SIM and the second SIM via the two or more antenna ports of the UE, the concurrent communications including first communications using the first SIM and second communications using the second SIM;

identifying a low noise amplifier configuration from two or more available low noise amplifier configurations for receiving each of the first communications using the first SIM and the second communications using the second SIM based at least in part on activation of the dual-subscriber dual-active mode, the identifying of the low noise amplifier configuration based at least in part on a difference between a first received signal strength associated with the first communications using the first SIM and a second received signal strength associated with the second communications using the second SIM; and receiving the first communications and the second communications via the two or more antenna ports based at least in part on the identified low noise amplifier configuration.

2. The method of claim 1, wherein the identifying the low noise amplifier configuration comprises:

measuring the first received signal strength associated with the first communications using the first SIM and the second received signal strength associated with the second communications using the second SIM to determine the difference between the first received signal strength and the second received signal strength;

selecting, responsive to the difference between the first received signal strength and the second received signal strength being less than or equal to a first threshold value, a first low noise amplifier configuration in which each of the first SIM and the second SIM use each of a plurality of low noise amplifiers associated with a set of antenna ports that receive both the first communications and the second communications; and selecting, responsive to the difference between the first received signal strength and the second received signal strength exceeding the first threshold value, a second low noise amplifier configuration in which the first SIM controls a first subset of low noise amplifiers associated with a first subset of the set of antenna ports, and the second SIM controls a second subset of low noise amplifiers associated with a second subset of the set of antenna ports.

3. The method of claim 2, wherein the first subset of low noise amplifiers and the second subset of low noise amplifiers are determined based at least in part on a magnitude of the difference between the first received signal strength and the second received signal strength.

4. The method of claim 2, wherein the first SIM controls a gain of each of the plurality of low noise amplifiers in the first low noise amplifier configuration.

5. The method of claim 2, wherein the first SIM controls a gain of each of the first subset of low noise amplifiers, and the second SIM controls the gain of each of the second subset of low noise amplifiers, in the second low noise amplifier configuration.

6. The method of claim 2, wherein the first SIM uses signals from each antenna port of the first subset of the set of antenna ports and the second subset of the set of antenna ports for receiving the first communications when the second low noise amplifier configuration is selected.

7. The method of claim 2, wherein the first SIM does not use any of the antenna ports of the second subset of the set of antenna ports for receiving the first communications when the second low noise amplifier configuration is selected.

8. The method of claim 2, wherein the first SIM does not use any of the antenna ports of the second subset of the set of antenna ports for receiving the first communications when the second low noise amplifier configuration is selected, and the second SIM does not use any of the antenna ports of the first subset of the set of antenna ports for receiving the second communications when the second low noise amplifier configuration is selected.

9. The method of claim 1, wherein the identified low noise amplifier configuration provides for control of a plurality of low noise amplifiers at the UE, the plurality of low noise amplifiers include two or more internal low noise amplifiers that are internal to a wireless modem of the UE and two or more external low noise amplifiers that are external to the wireless modem of the UE, and wherein the first communications link and the second communications link each comprise one or more component carriers.

10. The method of claim 9, wherein radio frequency signals from each of the two or more external low noise amplifiers are split and provided to respective first internal low noise amplifiers associated with the first SIM and second internal low noise amplifiers associated with the second SIM.

11. The method of claim 9, wherein radio frequency signals from each of the two or more external low noise amplifiers are provided to an associated internal low noise amplifier, and an output from each of the two or more internal low noise amplifiers are split and provided to separate processing chains associated with the first SIM and the second SIM.

12. The method of claim 9, wherein the first SIM controls an automatic gain control for at least a first subset of the plurality of low noise amplifiers, and the second SIM controls the automatic gain control for at least a second subset of the plurality of low noise amplifiers, and wherein a timing for updating the automatic gain control is based at least in part on which of the first SIM or the second SIM controls an associated low noise amplifier.

13. The method of claim 9, wherein the identifying the low noise amplifier configuration comprises:

determining that the difference between the first received signal strength associated with the first communications and the second received signal strength associated with the second communications exceeds a threshold value, and selecting, responsive to the determining, the low noise amplifier configuration in which the first SIM controls at least one of the two or more internal low noise amplifiers and at least one of the two or more external low noise amplifiers, and in which the second SIM controls at least one of the two or more internal low noise amplifiers.

14. The method of claim 13, wherein the threshold value is based at least in part on a gain control or dynamic tuning range of the two or more internal low noise amplifiers.

15. The method of claim 1, further comprising:

determining that the first SIM has a higher priority than the second SIM; and mapping a first subset of the two or more antenna ports to the first SIM based at least in part on the higher priority of the first SIM, and wherein the low noise amplifier configuration is based at least in part on the mapping.

16. The method of claim 1, wherein the receiving further comprises:

setting one or more analog-to-digital converter (ADC) parameters for the first communications based at least in part on a frequency offset between the first communications and the second communications when the first communications have a stronger signal strength than the second communications.

17. The method of claim 1, wherein the identifying comprises identifying a first low noise amplifier configuration based at least in part on the difference between the first received signal strength and the second received signal strength being less than or equal to a first threshold value, the first low noise amplifier configuration providing that each SIM uses each antenna port and associated low noise amplifiers for receiving the respective first and second communications, and wherein the method further comprises:

determining, subsequent to identifying the first low noise amplifier configuration, that the difference between the first received signal strength and the second received signal strength exceeds the first threshold value;

selecting a second low noise amplifier configuration responsive to the determining, wherein the second low noise amplifier configuration provides that the first SIM controls a first subset of low noise amplifiers associated with a first subset of the two or more antenna ports, and the second SIM controls a second subset of low noise amplifiers associated with a second subset of the two or more antenna ports;

receiving the first communications via the first subset of the two or more antenna ports using the first subset of low noise amplifiers; and receiving the second communications via the second subset of the two or more antenna ports using the second subset of low noise amplifiers.

18. The method of claim 17, wherein the difference between the first received signal strength and the second received signal strength is determined based at least in part on filtered received signal strength indicators (RSSIs) in a sliding window, the filtered RSSIs associated with the first communications and the second communications.

19. The method of claim 17, wherein the determining comprises:

determining that the difference between the first received signal strength and the second received signal strength exceeds the first threshold value on a predetermined number of occasions within a predetermined time period.

20. The method of claim 17, further comprising:

determining, subsequent to the selection of the second low noise amplifier configuration, that the difference between the first received signal strength and the second received signal strength is less than or equal to a second threshold value;

selecting the first low noise amplifier configuration responsive to the determining that the difference between the first received signal strength and the second received signal strength is less than or equal to the second threshold value; and receiving the first communications and the second communications via the two or more antenna ports based at least in part on the first low noise amplifier configuration.

21. The method of claim 20, wherein the second threshold value is less than the first threshold value.

22. The method of claim 17, wherein the first SIM controls a plurality of low noise amplifiers in the first low noise amplifier configuration during periods in which the first SIM is not in a sleep mode, and the second SIM controls the plurality of low noise amplifiers in the first low noise amplifier configuration during periods in which the first SIM is in the sleep mode.

23. The method of claim 17, wherein the first SIM suspends communications during one or more slots based at least in part on a timing drift associated with the first communications or a time division duplexing (TDD) configuration mismatch between the first communications and the second communications.

24. The method of claim 1, wherein:

a first low noise amplifier configuration of the two or more available low noise amplifier configurations is identified for receiving the first communications and the second communications based at least in part on the difference between the first received signal strength and the second received signal strength being less than or equal to a first threshold value, the first low noise amplifier configuration providing that each SIM uses each antenna port and associated low noise amplifiers for receiving the respective first and second communications, and wherein gain control for each of the associated low noise amplifiers is controlled by the first SIM when the first received signal strength exceeds the second received signal strength.

25. The method of claim 1, wherein the identifying comprises:

identifying a first low noise amplifier configuration responsive to the UE being in a first state in which the difference between the first received signal strength and the second received signal strength is less than or equal to a first threshold value and each SIM uses each of the two or more antenna ports for the concurrent communications;

identifying a second low noise amplifier configuration responsive to the UE being in a second state in which the difference between the first received signal strength and the second received signal strength exceeds the first threshold value, the second low noise amplifier configuration providing that one of the first SIM or the second SIM that has a lower service priority provides gain control for a first subset of the two or more antenna ports that have relatively larger differences in received signal strength and another of the first SIM or the second SIM provides gain control for other antenna ports outside of the first subset of the two or more antenna ports; and identifying a third low noise amplifier configuration responsive to the UE being in a third state in which the difference between the first received signal strength and the second received signal strength exceeds a second threshold value that is greater than the first threshold value, the third low noise amplifier configuration providing that one of the first SIM or the second SIM that has a higher service priority uses only a first subset of the two or more antenna ports that have relatively smaller differences in received signal strength and the other of the first SIM or the second SIM uses only one or more other antenna ports outside of the first subset of the two or more antenna ports.

26. An apparatus for wireless communication at a user equipment (UE), comprising:

a processor;

memory coupled with the processor; and instructions stored in the memory and executable by the processor to cause the apparatus to:

establish a first communications link via two or more antenna ports using a first subscriber identity module (SIM) of the UE in a dual-subscriber dual-active mode;

establish a second communications link via the two or more antenna ports using a second SIM of the UE in the dual-subscriber dual-active mode, the dual-subscriber dual-active mode for receiving concurrent communications for at least the first SIM and the second SIM via the two or more antenna ports of the UE, the concurrent communications including first communications using the first SIM and second communications using the second SIM;

identify a low noise amplifier configuration from two or more available low noise amplifier configurations for receiving each of the first communications using the first SIM and the second communications using the second SIM based at least in part on activation of the dual-subscriber dual-active mode, the identifying of the low noise amplifier configuration based at least in part on a difference between a first received signal strength associated with the first communications using the first SIM and a second received signal strength associated with the second communications using the second SIM; and receive the first communications and the second communications via the two or more antenna ports based at least in part on the identified low noise amplifier configuration.

27. The apparatus of claim 26, wherein the instructions to identify the low noise amplifier configuration are executable by the processor to cause the apparatus to:

measure the first received signal strength associated with the first communications using the first SIM and the second received signal strength associated with the second communications using the second SIM to determine a difference between the first received signal strength and the second received signal strength;

select, responsive to the difference between the first received signal strength and the second received signal strength being less than or equal to a first threshold value, a first low noise amplifier configuration in which each of the first SIM and the second SIM use each of a plurality of low noise amplifiers associated with a set of antenna ports that receive both the first communications and the second communications; and select, responsive to the difference between the first received signal strength and the second received signal strength exceeding the first threshold value, a second low noise amplifier configuration in which the first SIM controls a first subset of low noise amplifiers associated with a first subset of the set of antenna ports, and the second SIM controls a second subset of low noise amplifiers associated with a second subset of the set of antenna ports.

28. The apparatus of claim 26, wherein the identified low noise amplifier configuration provides for control of a plurality of low noise amplifiers at the UE, the plurality of low noise amplifiers include two or more internal low noise amplifiers that are internal to a wireless modem of the UE and two or more external low noise amplifiers that are external to the wireless modem of the UE.

29. An apparatus for wireless communication at a user equipment (UE), comprising:

means for establishing a first communications link via two or more antenna ports using a first subscriber identity module (SIM) of the UE in a dual-subscriber dual-active mode;

means for establishing a second communications link via the two or more antenna ports using a second SIM of the UE in the dual-subscriber dual-active mode, the dual-subscriber dual-active mode for receiving concurrent communications for at least the first SIM and the second SIM via the two or more antenna ports of the UE, the concurrent communications including first communications using the first SIM and second communications using the second SIM;

means for identifying a low noise amplifier configuration from two or more available low noise amplifier configurations for receiving each of the first communications using the first SIM and the second communications using the second SIM based at least in part on activation of the dual-subscriber dual-active mode, the identifying of the low noise amplifier configuration based at least in part on a difference between a first received signal strength associated with the first communications using the first SIM and a second received signal strength associated with the second communications using the second SIM; and means for receiving the first communications and the second communications via the two or more antenna ports based at least in part on the identified low noise amplifier configuration.

30. A non-transitory computer-readable medium storing code for wireless communication at a user equipment (UE), the code comprising instructions executable by a processor to:

establish a first communications link via two or more antenna ports using a first subscriber identity module (SIM) of the UE in a dual-subscriber dual-active mode;

establish a second communications link via the two or more antenna ports using a second SIM of the UE in the dual-subscriber dual-active mode, the dual-subscriber dual-active mode for receiving concurrent communications for at least the first SIM and the second SIM via the two or more antenna ports of the UE, the concurrent communications including first communications using the first SIM and second communications using the second SIM;

identify a low noise amplifier configuration from two or more available low noise amplifier configurations for receiving each of the first communications using the first SIM and the second communications using the second SIM based at least in part on activation of the dual-subscriber dual-active mode, the identifying of the low noise amplifier configuration based at least in part on a difference between a first received signal strength associated with the first communications using the first SIM and a second received signal strength associated with the second communications using the second SIM; and receive the first communications and the second communications via the two or more antenna ports based at least in part on the identified low noise amplifier configuration.

\* \* \* \* \*